US012725379B2

(12) United States Patent
Wang et al.

(10) Patent No.: US 12,725,379 B2
(45) Date of Patent: Sep. 1, 2026

(54) METHOD AND APPARATUS FOR CONTROLLING VIRTUAL OBJECT, ELECTRONIC DEVICE, STORAGE MEDIUM, AND PROGRAM PRODUCT

(71) Applicant: Tencent Technology (Shenzhen) Company Limited, Shenzhen (CN)

(72) Inventors: Shuai Wang, Shenzhen (CN); Jianquan Li, Shenzhen (CN); Xiaofeng Chen, Shenzhen (CN); Qiwen Zheng, Shenzhen (CN); Guangxin Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 351 days.

(21) Appl. No.: 18/379,108

(22) Filed: Oct. 11, 2023

(65) Prior Publication Data

US 2024/0037885 A1 Feb. 1, 2024

Related U.S. Application Data

(63) Continuation of application No. PCT/CN2022/136135, filed on Dec. 2, 2022.

(30) Foreign Application Priority Data

Mar. 9, 2022 (CN) ......................... 202210226658.9

(51) Int. Cl.
*G06T 19/20* (2011.01)
*G06T 7/70* (2017.01)
*G06V 10/74* (2022.01)

(52) U.S. Cl.
CPC ................ *G06T 19/20* (2013.01); *G06T 7/70* (2017.01); *G06V 10/761* (2022.01); *G06T 2219/2004* (2013.01)

(58) Field of Classification Search
CPC ...... G06F 3/04815; G06F 3/011; A63F 13/55; A63F 13/428; A63F 13/533; A63F 13/52;
(Continued)

(56) References Cited

U.S. PATENT DOCUMENTS 11,007,439 B1 * 5/2021 Pineda .................. A63F 13/847
2018/0214777 A1 * 8/2018 Hingorani ........... A63F 13/5255
(Continued)

FOREIGN PATENT DOCUMENTS

CN 108434731 A 8/2018
CN 110302537 A 10/2019
(Continued)

OTHER PUBLICATIONS

Tencent Technology, ISR, PCT/CN2022/136135, Feb. 21, 2023, 2 pgs.

*Primary Examiner* — Xilin Guo
(74) *Attorney, Agent, or Firm* — Morgan, Lewis & Bockius LLP

(57) ABSTRACT

This application provides a method for controlling a virtual object in a virtual scene performed by an electronic device. The method includes: presenting, in the virtual scene, a first virtual object and at least one second virtual object that is in an action execution state of a target performance, wherein the action execution state of the target performance indicates that the second virtual object performs an action of the target performance in the virtual scene; in response to a movement control instruction for the first virtual object, controlling the first virtual object to move in the virtual scene; and during movement of the first virtual object, when a position of the first virtual object meets an execution condition of the target performance, controlling the first virtual object to automatically perform the action of the target performance.

16 Claims, 12 Drawing Sheets

(58) Field of Classification Search
CPC ... G06T 19/20; G06T 7/70; G06T 2219/2004; G06T 19/006; G06T 7/20; G06T 2219/024; G06V 10/761; G06V 40/28; G06V 40/25; G06V 40/20
See application file for complete search history.

(56) References Cited

U.S. PATENT DOCUMENTS

2020/0319771 A1 10/2020 Liao et al.
2021/0394067 A1* 12/2021 Saito ....................... A63F 13/57
2024/0012491 A1* 1/2024 Torres ................... G06T 19/003

FOREIGN PATENT DOCUMENTS

CN 110737435 A 1/2020
CN 111744185 A 10/2020
CN 112057860 A 12/2020

* cited by examiner

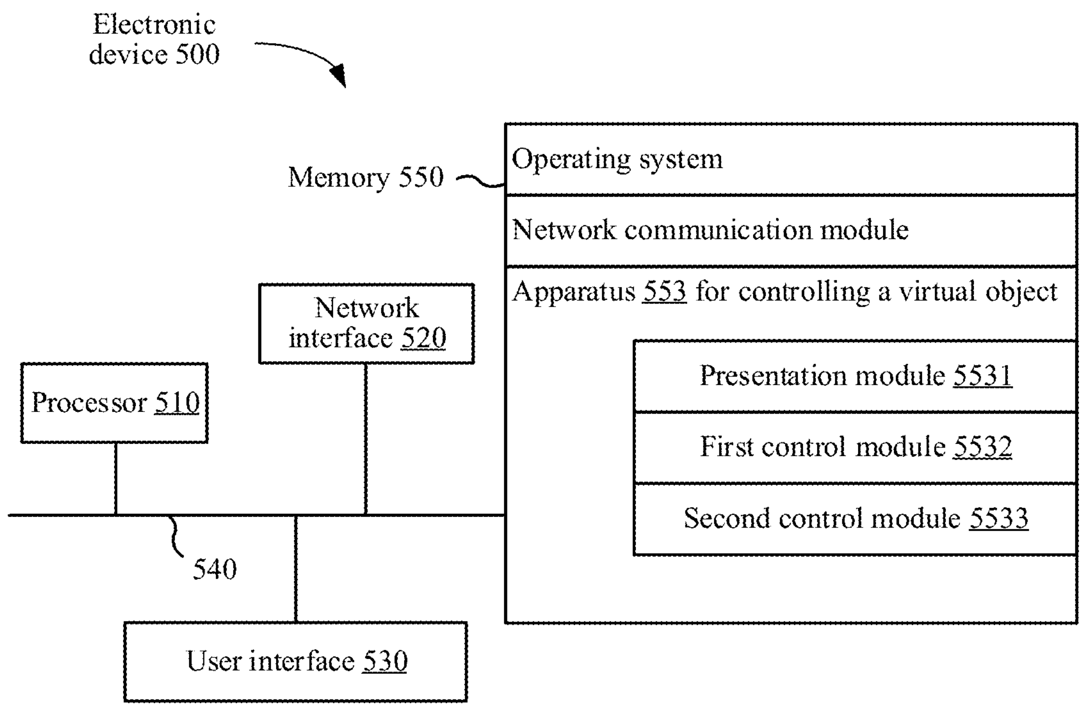

FIG. 2

Terrain management
Virtual camera
A* path-finding
Scene editor
Model editor
Special effect editor
Action editor
Editor
Collision body
AABB
OBB
Scene organization
Viewing frustum
Particle special effect
UV animation
Special effect component
Game engine
Rendering component
Model rendering
Scene rendering
Skeleton
Skin
Skeleton animation
Matrix transformation
Vector transformation
Graphics algorithm
Underlying algorithm
Morph animation
UI control

FIG. 3

METHOD AND APPARATUS FOR CONTROLLING VIRTUAL OBJECT, ELECTRONIC DEVICE, STORAGE MEDIUM, AND PROGRAM PRODUCT

CROSS-REFERENCE TO RELATED APPLICATIONS

This application is a continuation application of PCT Patent Application No. PCT/CN2022/136135, entitled "NETWORK COMMUNICATION METHOD AND APPARATUS, COMPUTER DEVICE, AND STORAGE MEDIUM" filed on Dec. 2, 2022, which is based on and claims priority to Chinese Patent Application No. 202210226658.9, entitled "NETWORK COMMUNICATION METHOD AND APPARATUS, COMPUTER DEVICE, AND STORAGE MEDIUM" filed on Mar. 9, 2022, all of which is incorporated herein by reference in its entirety.

FIELD OF THE TECHNOLOGY

This application relates to the field of virtualization and man-machine interaction technologies, and in particular, to a method and apparatus for controlling a virtual object, an electronic device, a computer-readable storage medium, and a computer program product.

BACKGROUND OF THE DISCLOSURE

A display technology based on graphics processing hardware expands channels for perceiving an environment and obtaining information, especially a multimedia technology for a virtual scene. With the help of a man-machine interaction engine technology, diversified interactions between virtual objects controlled by a user or artificial intelligence may be implemented according to an actual application requirement, and there are various typical application scenarios. For example, in a game scene, a real interaction process between virtual objects may be simulated.

Using an action of controlling the virtual object in the virtual scene to perform performances (such as dance and martial arts) as an example, in the related technology, a user needs to perform a plurality of and continuous man-machine interaction operations such as tapping, touch-and-hold, and swiping, to achieve a purpose of controlling the virtual object to perform a performance action. An implementation process is complex, and efficiency of man-machine interaction is low, resulting in a waste of hardware processing resources.

SUMMARY

Embodiments of this application provide a method and apparatus for controlling a virtual object, an electronic device, a computer-readable storage medium, and a computer program product, which can improve efficiency of man-machine interaction and utilization of hardware processing resources.

The technical solutions in the embodiments of this application are implemented as follows:

An embodiment of this application provides a method for controlling a virtual object in a virtual scene performed by an electronic device, the method including:

- presenting, in the virtual scene, a first virtual object and at least one second virtual object that is in an action execution state of a target performance, wherein the action execution state of the target performance indicates that the second virtual object performs an action of the target performance in the virtual scene;
- controlling, in response to a movement control instruction for the first virtual object, the first virtual object to move in the virtual scene; and
- during movement of the first virtual object, when a position of the first virtual object meets an execution condition of the target performance, controlling the first virtual object to automatically perform the action of the target performance.

An embodiment of this application further provides an electronic device, including:

- a memory, configured to store computer-executable instructions; and
- a processor, configured to execute the computer-executable instructions and cause the electronic device to implement the method for controlling a virtual object provided in this embodiment of this application when executing the computer-executable instructions stored in the memory.

An embodiment of this application further provides a non-transitory computer-readable storage medium storing computer-executable instructions, the computer-executable instructions, when executed by a processor by a processor of an electronic device, causing the electronic device to implement the method for controlling a virtual object provided in this embodiment of this application.

This embodiment of this application has the following beneficial effects:

In the embodiments of this application, in a virtual scene, there are a first virtual object and at least one second virtual object that is in an action execution state of a target performance, where the target performance includes at least one action, and the action execution state of the target performance is used for indicating that the second virtual object performs the action of the target performance; and in a process of controlling the first virtual object to move in the virtual scene, if a position of the first virtual object meets an execution condition of the target performance, the first virtual object is controlled to automatically perform the action of the target performance. In this way, in the virtual scene in which the second virtual object is in the action execution state of the target performance, only by controlling the first virtual object to move to a position that meets the execution condition of the target performance, a control purpose of controlling the first virtual object to automatically perform the action of the target performance may be achieved. This may reduce a quantity of man-machine interactions required to achieve the control purpose, thereby improving efficiency of man-machine interaction and utilization of hardware processing resources.

BRIEF DESCRIPTION OF THE DRAWINGS

FIG. 2 is a schematic diagram of a structure of an electronic device 500 implementing a method for controlling a virtual object according to an embodiment of this application;

FIG. 3 is a schematic diagram of a principle of a man-machine interaction engine installed in a control apparatus of a virtual object according to an embodiment of this application;

DESCRIPTION OF EMBODIMENTS

Figure 1A:
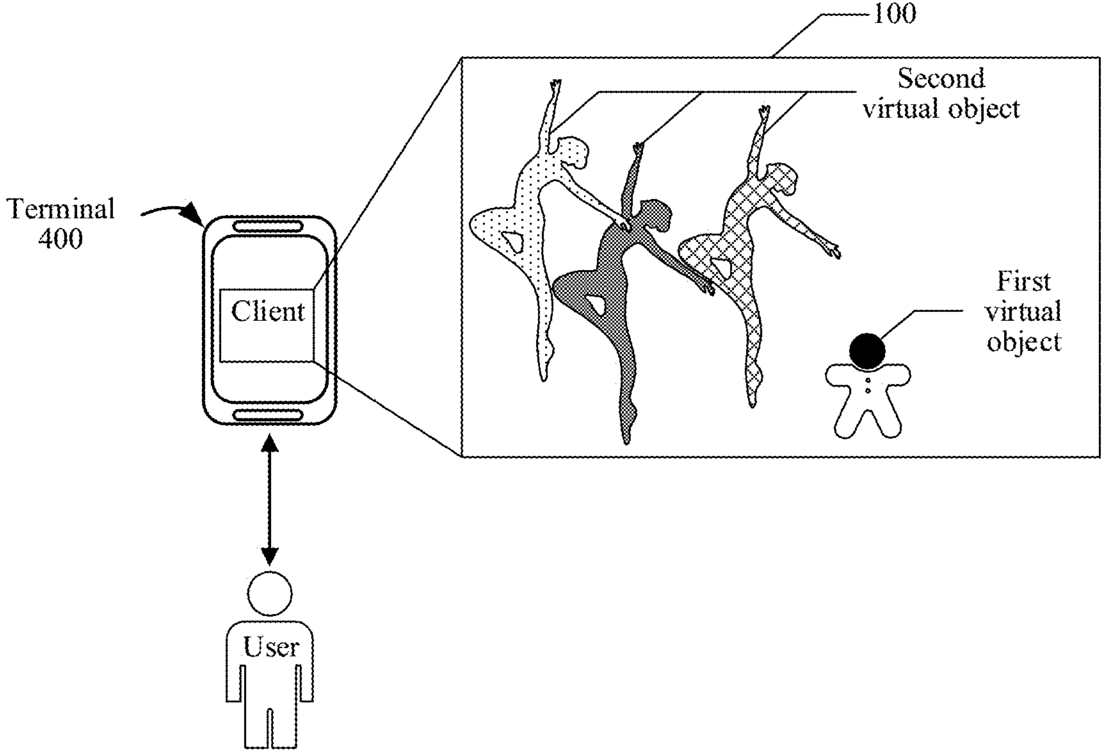
FIG. 1A is a schematic diagram of an application mode of a method for controlling a virtual object according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, a description is made on nouns and terms involved in the embodiments of this application, and the nouns and terms involved in the embodiments of this application are applicable to the following explanations.

(1) Client is an application run on a terminal that is configured to provide various services, such as a game client.

(2) "In response to" is used for representing a condition or status on which one or more operations to be performed depend. When the condition or status is met, the one or more operations may be performed immediately or after a set delay. Unless otherwise specified, there is no restriction on an order in which the operations are performed.

3) Virtual scene is a virtual scene displayed (or provided) when an application is run on a terminal. The virtual scene may be a simulated environment of a real world, or may be a semi-simulated semi-fictional virtual environment, or may be an entirely fictional virtual environment. The virtual scene may be any one of a two-dimensional virtual scene, a 2.5-dimensional virtual scene, or a three-dimensional virtual scene.

For example, the virtual scene may include the sky, the land, the ocean, or the like. The land may include environmental elements such as the desert and a city. The user may control the virtual object to move in the virtual scene. The movement includes, but is not limited to, at least one of body posture adjustment, crawling, walking, running, cycling, jumping, driving, picking, shooting, attacking, and throwing. The virtual scene may display the virtual scene from a first-person perspective (for example, playing a virtual object in the game by using a perspective of the user); may also display the virtual scene from a third-person perspective (for example, the user chases the virtual object in the game to play the game); and may further display the virtual scene from a bird's-eye perspective, and the foregoing perspectives may be switched at will.

(4) Virtual objects are images of various people and objects that can interact in a virtual scene, or movable objects in the virtual scene. The movable object may be a virtual character, a virtual animal, a cartoon character, or the like, for example, a character, an animal, a plant, an oil drum, a wall, or a stone displayed in a virtual scene. The virtual object may be a virtual image used for representing a user in the virtual scene. The virtual scene may include a plurality of virtual objects, and each virtual object has a shape and a volume in the virtual scene, and occupies some space in the virtual scene.

For example, the virtual object may be a player character controlled through an operation on a client, or may be an artificial intelligence (AI) character set in a virtual scene battle through training, or may be a non-player character (NPC) set in a virtual scene interaction. A quantity of virtual objects participating in the interaction in the virtual scene may be preset, or may be dynamically determined according to a quantity of clients participating in the interaction.

(5) Scene data represents feature data of the virtual scene. For example, the scene data may be a position of the virtual object in the virtual scene, a position of the virtual building in the virtual scene, and a floor area of the virtual building, or the like. Certainly, different types of feature data may be included according to the type of the virtual scene; and for example, in the virtual scene of a game, scene data can include a period of time (depending on a quantity of times the same function can be used in a specific period of time) that needs to be waited for various functions configured in the game, and can further represent attribute values of various states of a game character, such as a health point (also referred to as a hit point), a magic point (also referred to as a mana point), a state point, a health point, and the like.

Embodiments of this application provide a method and apparatus for controlling a virtual object, an electronic device, a non-transitory computer-readable storage medium, and a computer program product, which can improve efficiency of man-machine interaction and utilization of hardware processing resources.

For ease of understanding the method for controlling a virtual object provided in the embodiments of this application, an exemplary implementation scenario of the method for controlling a virtual object provided in the embodiments of this application is described below. The virtual scene in the method for controlling a virtual object provided in the embodiments of this application may be completely based on an output of the terminal device, or may be based on a cooperative output of the terminal device and the server.

In some embodiments, the virtual scene may be an environment for game characters to interact with each other, for example, may be an environment for the game characters to dance, perform, or battle. By controlling an action of the game character, the user may interact with each other in the virtual scene, allowing the user to gain a gaming experience during the game.

In an implementation scenario, FIG. 1A is a schematic diagram of an application mode of a method for controlling a virtual object according to an embodiment of this application, which is suitable for some application modes in which calculation of related data of the virtual scene 100 may be completed completely relying on a computing capability of a terminal 400. For example, in a game in a stand-alone/offline mode, an output of the virtual scene is completed through the terminal 400 such as a smartphone, a tablet computer, and a virtual reality/augmented reality device. When forming visual perception of the virtual scene 100, the terminal 400 calculates and displays the required data through graphics computing hardware, and completes loading, parsing, and rendering of display data. The graphics output hardware outputs a video frame that may form the visual perception of the virtual scene. For example, a two-dimensional video frame is presented on a display screen of a smartphone, or a video frame that implements a three-dimensional display effect is projected on lenses of augmented reality/virtual reality glasses; and in addition, to enrich the perception effect, the device may further form one or more of auditory perception, tactile perception, motion perception, and taste perception by using different hardware.

As an example, the terminal 400 runs a client (such as a stand-alone game client). The virtual scene is output in a running process of the client. The virtual scene is an environment for the game characters to interact with each other, for example, may be a plain, a street, a valley, or the like for the game character to perform battles; and presents a first virtual object in the virtual scene and at least one second virtual object in an action execution state of a target performance, where the target performance includes at least one action, the action execution state of the target performance is used for indicating that the second virtual object performs an action of the target performance, and the first virtual object may be the game character controlled by the user; the terminal 400, in response (the user) to a movement control instruction for the first virtual object triggered by a controller (including a touch screen, a voice-activated switch, a keyboard, a mouse, a joystick, and the like), controls the first virtual object to move in the virtual scene; and during movement of the first virtual object, controls, when a position of the first virtual object meets an execution condition of the target performance, the first virtual object to automatically perform the action of the target performance.

Figure 1B:
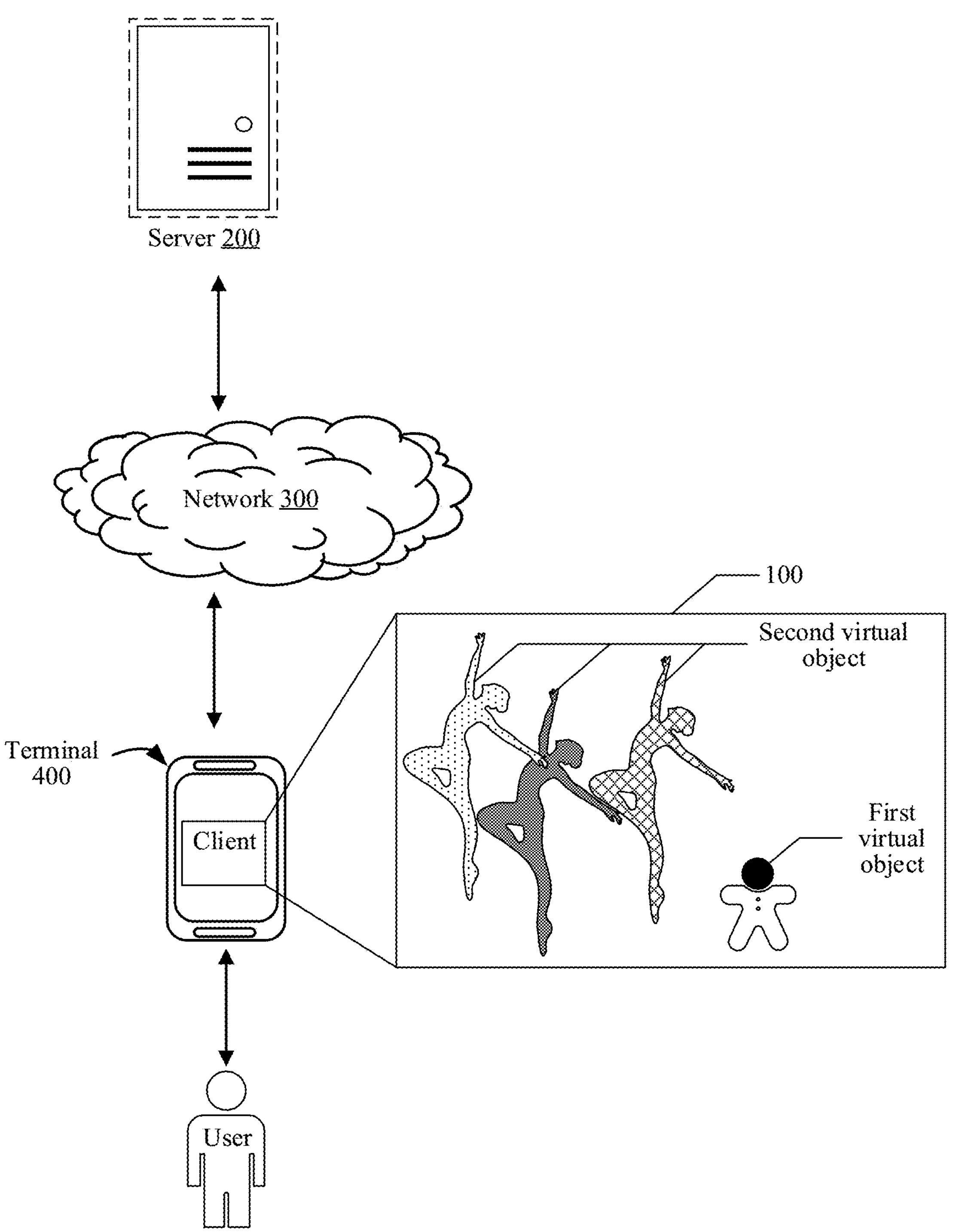
FIG. 1B is a schematic diagram of an application mode of a method for controlling a virtual object according to an embodiment of this application.

In another implementation scenario, FIG. 1B is a schematic diagram of an application mode of a method for controlling a virtual object according to an embodiment of this application, applied to the terminal 400 and the server 200, and generally, is suitable for an application mode relying on a computing capability of the server 200 to complete calculation of the virtual scene and output the virtual scene on the terminal 400. Using visual perception of the virtual scene 100 as an example, the server 200 calculates display data related to the virtual scene and sends the display data to the terminal 400. The terminal 400 relies on graphics computing hardware to complete loading, parsing, and rendering of calculation display data, and relies on graphics output hardware to output the virtual scene to form the visual perception. For example, a two-dimensional video frame may be presented on a display screen of a smartphone, or a video frame that implements a three-dimensional display effect is projected on lenses of augmented reality/virtual reality glasses; and for the perception of the form of the virtual scene, it may be understood that auditory perception may be formed by using a corresponding hardware output of the terminal, such as by using a microphone output, and tactile perception may be formed by using a vibrator output, and the like.

As an example, the terminal 400 runs a client (such as a game client of an online version), obtains scene data of the virtual scene by connecting to a game server (namely, the server 200), and outputs the virtual scene based on the obtained scene data, to perform game interact with other users in the virtual scene. The terminal 400 presents a first virtual object in a virtual scene and at least one second virtual object in an action execution state of a target performance, where the target performance includes at least one action, the action execution state of the target performance is used for indicating that the second virtual object performs an action of the target performance, and the first virtual object may be the game character controlled by the user; the terminal 400, in response (the user) to a movement control instruction for the first virtual object triggered by a controller (including a touch screen, a voice-activated switch, a keyboard, a mouse, a joystick, and the like), controls the first virtual object to move in the virtual scene; and during movement of the first virtual object, controls, when a position of the first virtual object meets an execution condition of the target performance, the first virtual object to automatically perform the action of the target performance.

In some embodiments, the terminal 400 or the server 200 may implement the method for controlling a virtual object provided in this embodiment of this application by running a computer program. For example, the computer program may be a native program or a software module in an operating system; may be a native application (APP), namely, a program (such as a game client) that needs to be installed in the operating system to run; may also be a mini program, namely, a program that only needs to be downloaded into a browser environment to run; and may be further a mini program (such as a game mini program) that may be embedded in any APP. In summary, the computer program may be any form of application, module, or plug-in.

This embodiment of this application may be implemented with the help of a cloud technology. The cloud technology is a hosting technology that unifies a series of resources such as hardware, software, and networks in a wide area network or a local area network to implement computing, storage, processing, and sharing of data. The cloud technology is a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A backend service of a technical network system requires a large amount of computing and storage resources.

As an example, the server (for example, server 200) may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal (such as the terminal 400) may be a smartphone, a tablet computer, a notebook computer, a desktop computer, an intelligent voice interaction device (such as a smart speaker), a smart home appliance (such as a smart TV), a smart watch, a vehicle-mounted terminal, or the like, but is not limited thereto. The terminal and the server may be directly or indirectly connected in a wired or wireless communication manner. This is not limited in this embodiment of this application.

In some embodiments, a plurality of servers may form a blockchain, and the servers are nodes on the blockchain. Each node in the blockchain may have an information connection, and the nodes may transmit information through the information connection. Data (such as the scene data of the virtual scene) related to the method for controlling a virtual object provided in this embodiment of this application may be saved on the blockchain.

An electronic device implementing a method for controlling a virtual object according to an embodiment of this application is described below. FIG. 2 is a schematic diagram of a structure of an electronic device 500 implementing a method for controlling a virtual object according to an embodiment of this application. An example in which the electronic device 500 is used as the terminal shown in FIG. 1 is used. The electronic device 500 implementing the method for controlling a virtual object provided in this embodiment of this application includes: at least one processor 510, a memory 550, at least one network interface 520, and a user interface 530. All the components in the electronic device 500 are coupled together by using a bus system 540. It may be understood that the bus system 540 is configured to implement connection and communication between the components. In addition to a data bus, the bus system 540 further includes a power bus, a control bus, and a status signal bus. However, for ease of clear description, all types of buses in FIG. 2 are marked as the bus system 540.

In some embodiments, the apparatus for controlling a virtual object provided in this embodiment of this application may be implemented by using software. FIG. 2 shows an apparatus 553 apparatus for controlling a virtual object stored in the memory 550. The apparatus for controlling a virtual object may be software in a form such as a program or a plug-in, and includes the following software modules: a presentation module 5531, a first control module 5532, and a second control module 5533. These modules are logical modules, and therefore may be randomly combined or further divided according to a function to be implemented, and the function of each module will be described below.

The method for controlling a virtual object provided in this embodiment of this application may be implemented by each module in the apparatus for controlling a virtual object shown in FIG. 2 by invoking the related modules, components, or plug-ins of the game engine shown in FIG. 3. The following is an exemplary description of the modules, components, or plug-ins included in the game engine shown in FIG. 3.

As shown in FIG. 3, FIG. 3 includes: (1) a virtual camera, which is a necessary component of a game scene screen, and is used for presentation of the game scene screen. One game scene corresponds to at least one virtual camera. According to actual needs, there may be two or more windows used as game rendering windows, to capture and present screen content of a game world to the user. By setting parameters of the virtual camera, the perspective of the user of viewing the game world may be adjusted, such as a first-person perspective and a third-person perspective.

(2) Scene organization is used for game scene management, such as collision detection, visibility culling, and the like, where the collision detection may be implemented by a collision body. According to actual needs, the collision body may be implemented by an axis-aligned bounding box (AABB), or by an oriented bounding box (OBB); and the visibility culling may be implemented based on a viewing frustum. The viewing frustum is a three-dimensional frame generated according to the virtual camera, and is used to crop an object outside a visual range of the camera. An object that is in the viewing frustum will be projected onto a viewing plane, and an object that is not in the viewing frustum will be discarded and will not be processed.

(3) Terrain management is a component for terrain management in the game scene and is configured to create and edit a game terrain, such as creating terrains in the game scene such as a mountain, a canyon, and a cave.

(4) Editor is an auxiliary tool in game design, including:

a scene editor, configured to edit game scene content, such as changing a terrain, customizing vegetation distribution and lighting layout, and the like;

a model editor, configured to make and edit a model (a character model in the game scene) in the game;

a special effect editor, configured to edit a special effect in the game screen; and an action editor, configured to define and edit an action of a character in the game screen.

(5) Special effect component is configured to make and edit the game special effect in the game screen. In actual application, the special effect component may be implemented by using a particle special effect and texture UV animation, where the particle special effect is a combination of countless single particles to cause the single particles to present in a fixed form. By using a controller and a script, overall or individual movement is controlled, to simulate real-life effects such as water, fire, fog, and air; and the UV animation is a texture animation implemented by dynamically modifying UV coordinates of a map.

(6) Skeletal animation is an animation implemented by using a built-in bone to drive an object to move. The skeletal animation may be understood as the following two concepts:

skeleton: an abstract concept used for controlling skinning, such as controlling skin by using human skeleton; and skin: a factor controlled by skeleton and displayed on the outside, such as human skin affected by the skeleton.

(7) Morph animation, namely, a deformation animation, is implemented by adjusting a vertex of a basic model.

(8) UI control is a control configured to display the game screen.

(9) Underlying algorithm is an algorithm that needs to be invoked to implement a function in the game engine, such as a graphics algorithm that is required to implement scene organization, and matrix transformation and vector transformation that are required to implement the skeletal animation.

(10) Rendering component is a component necessary for rendering of a game screen effect. Through the rendering component, a scene described by a three-dimensional vector is converted into a scene described by a two-dimensional pixel, including model rendering and scene rendering.

(11) A* path-finding is an algorithm for finding a shortest path used in path planning, path-finding, and graph traversal in game design.

For example, interaction between the user and the game may be implemented by invoking the UI control in the game engine shown in FIG. 3. A two-dimensional model or three-dimensional model is made by invoking the morph animation part in the game engine, and after the model is made, a material map is assigned to the model according to different faces through the skeletal animation part. This is equivalent to covering the skeleton with skin, and finally all effects such as a model, an animation, light and shadow, and a special effect are calculated in real time through the rendering component and the effects are displayed on a man-machine interaction interface. Specifically, after performing rendering on the virtual scene data by invoking the rendering component in the game engine shown in FIG. 3, on the interface of the virtual scene, the presentation module 5531 may present the first virtual object in the virtual scene and at least one second virtual object in an action execution state of a target performance, where the target performance includes at least one action, and the action execution state of the target performance is used for indicating that the second virtual object performs an action of the target performance.

The first control module 5532 may receive a movement control instruction for the first virtual object by invoking the UI control in the game engine shown in FIG. 3, and control, in response to the movement control instruction, the first virtual object to move in the virtual scene.

The second control module 5533 may invoke the underlying algorithm part in the game engine shown in FIG. 3, and during movement of the first virtual object, control the first virtual object to automatically perform the action of the target performance when determining that a position of the first virtual object meets an execution condition of the target performance.

Figure 4:
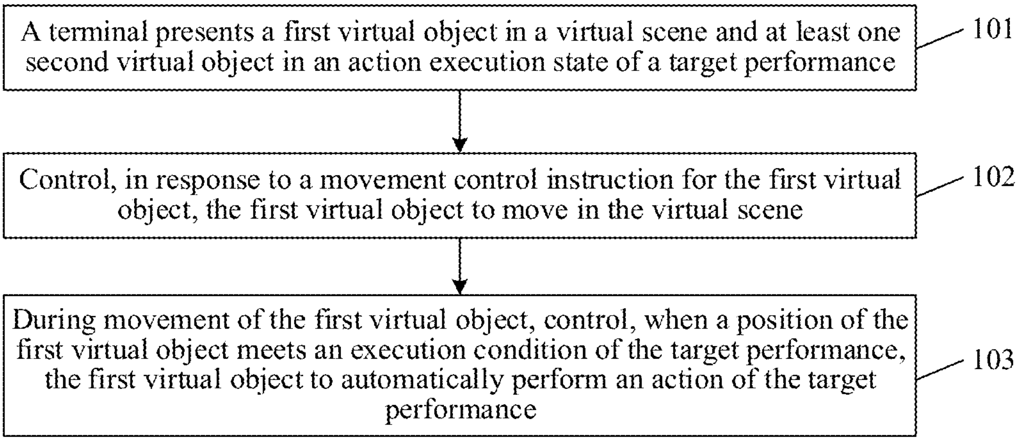
FIG. 4 is a schematic flowchart of a method for controlling a virtual object according to an embodiment of this application.

A method for controlling a virtual object according to an embodiment of this application is described below. In some embodiments, the method for controlling a virtual object provided in this embodiment of this application may be implemented by various electronic devices, for example, may be implemented by the terminal alone, by the server alone, or by the terminal and the server collaboratively. Using a terminal implementation as an example, FIG. 4 is a schematic flowchart of a method for controlling a virtual object according to an embodiment of this application. The method for controlling a virtual object provided in this embodiment of this application includes:

Step 101: A terminal presents a first virtual object in a virtual scene and at least one second virtual object in an action execution state of a target performance.

The target performance includes at least one action, and the action execution state of the target performance is used for indicating that the second virtual object performs the action of the target performance.

In actual application, the terminal may run a client (such as a game client) that supports the virtual scene, and the terminal outputs the virtual scene (such as a shooting game scene) during running of the client. In other words, the terminal displays a screen of the virtual scene, and presents the first virtual object in the virtual scene in the screen of the virtual scene, so that the user may control the first virtual object to interact in the virtual scene. For example, the first virtual object is a virtual image in the virtual scene corresponding to a user account currently logged in to the client. For example, the first virtual object may be a game character controlled by the user who enters the game scene. Certainly, the virtual scene may further include other virtual objects, such as at least one second virtual object, and the at least one second virtual object may be controlled by other users or by a robot program.

In this embodiment of this application, the at least one second virtual object is in an action execution state of the target performance, and the target performance includes at least one action. The action execution state of the target performance is used for indicating that each second virtual object performs the at least one action included in the target performance. In actual application, when the second virtual object is in the action execution state of the target performance, the second virtual object may be controlled to automatically perform the action of the target performance, and the second virtual object may also be controlled to perform the action of the target performance according to an operation of controlling a user by the second virtual object. Each action in the at least one action is continuous, for example, one action may be performed continuously and repeatedly, or an action sequence including a plurality of actions may be performed, and the plurality of actions included in the action sequence are continuous. As an example, the target performance may be a dance performance (including a plurality of continuous dance movements), a martial arts performance (including a plurality of continuous martial arts movements), a gymnastics performance (including a plurality of continuous gymnastics movements), and the like.

In some embodiments, the terminal may present at least one second virtual object in an action execution state of a target performance in the following manner: presenting a performance area corresponding to the target performance, where the performance area includes at least one performance position; and presenting, at each performance position, the second virtual object in the action execution state of the target performance, to present the at least one second virtual object in the action execution state of the target performance.

In actual application, the terminal may provide a performance area for the virtual object to perform. In other words, the terminal presents a performance area corresponding to the target performance, where the performance area includes at least one performance position. When the at least one second virtual object is in the action execution state of the target performance, the terminal may respectively present, at each performance position included in the performance area, the second virtual object in the action execution state of the target performance. There is a one-to-one correspondence between the second virtual object and the performance position.

Figure 5:
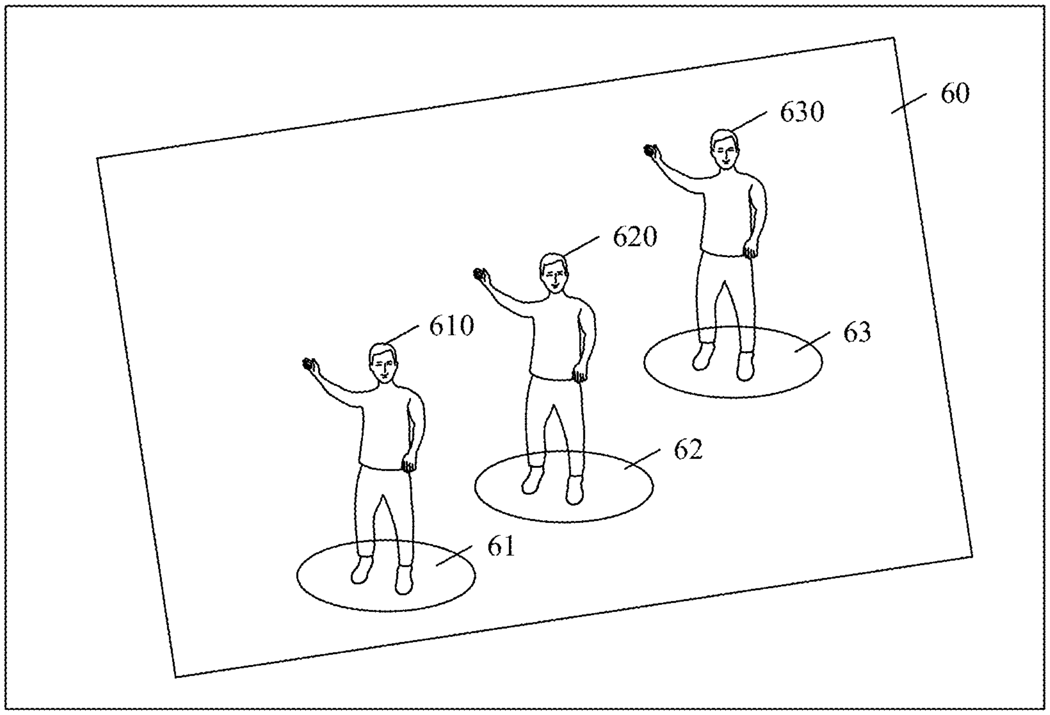
FIG. 5 is a schematic diagram of display of a second virtual object in an action execution state of a target performance according to an embodiment of this application.

As an example, FIG. 5 is a schematic diagram of display of a second virtual object in an action execution state of a target performance according to an embodiment of this application. A terminal presents a performance area 60 corresponding to the target performance. The performance area includes three performance positions, namely a performance position 61, a performance position 62, and a performance position 63. In addition, at each performance position, the second virtual object in the action execution state of the target performance is presented. In other words, a second virtual object 610 is presented at the performance position 61, a second virtual object 620 is presented at the performance position 62, and a second virtual object 630 is presented at the performance position 63.

In the foregoing embodiment, by setting a corresponding performance area and performance position for the target performance, the second virtual object in the action execution state of the target performance may be displayed under a proper display layout. This not only improves utilization of device display resources, but also improves viewability of the target performance, allowing a user who joins a virtual scene to watch a better target performance, and improving a scene effect of the virtual scene and a sense of immersion of the user.

In some embodiments, each performance position has a corresponding position number; and the terminal may present, at each performance position, the second virtual object in the action execution state of the target performance in the following manner: obtaining a joining order in which each second virtual object joins the target performance; and for each second virtual object, presenting the second virtual object in the action execution state of the target performance at a performance position indicated by a position number corresponding to the joining order of the second virtual object. Correspondingly, the terminal may control the first virtual object to automatically perform an action of the target performance in the following manner: at a performance position indicated by a position number corresponding to a joining order of the first virtual object, controlling the first virtual object to automatically perform the action of the target performance.

In actual application, the performance position included in the performance area may be numbered, so that each performance position has a corresponding position number. In addition, a corresponding relationship between the position number of the performance position and the joining order of the second virtual object may be further set, such as a position number 1 corresponds to a joining order 1, a position number 2 corresponds to a joining order 2, and the rest is deduced by analogy, to obtain a corresponding relationship between each position number and the joining order. In this way, in a joining order in which the second virtual object joins the target performance, the second virtual object in the action execution state of the target performance is presented at a performance position indicated by a position number corresponding to the joining order of the second virtual object.

Correspondingly, when the first virtual object is controlled to automatically perform the action of the target performance, first, a joining order of the first virtual object is obtained, then, at a performance position indicated by a position number corresponding to a joining order of the first virtual object, the first virtual object is displayed, and the first virtual object is controlled to automatically perform the action of the target performance.

In the foregoing embodiment, by setting a corresponding position number for each performance position in the performance area, each virtual object joining the target performance may be displayed in the virtual scene properly and orderly. This not only improves utilization of device display resources, but also improves viewability of the target performance, allowing the user who joins the virtual scene to watch a better target performance, and improving a scene effect of the virtual scene and a sense of immersion of the user.

In some embodiments, when there are at least two performance positions, the terminal may present a performance area corresponding to the target performance in the following manner: presenting a performance area including the at least two performance positions, where the at least two performance positions are arranged in an arrangement manner of a matrix, and the matrix forms a target shape.

Figures 6, 7:
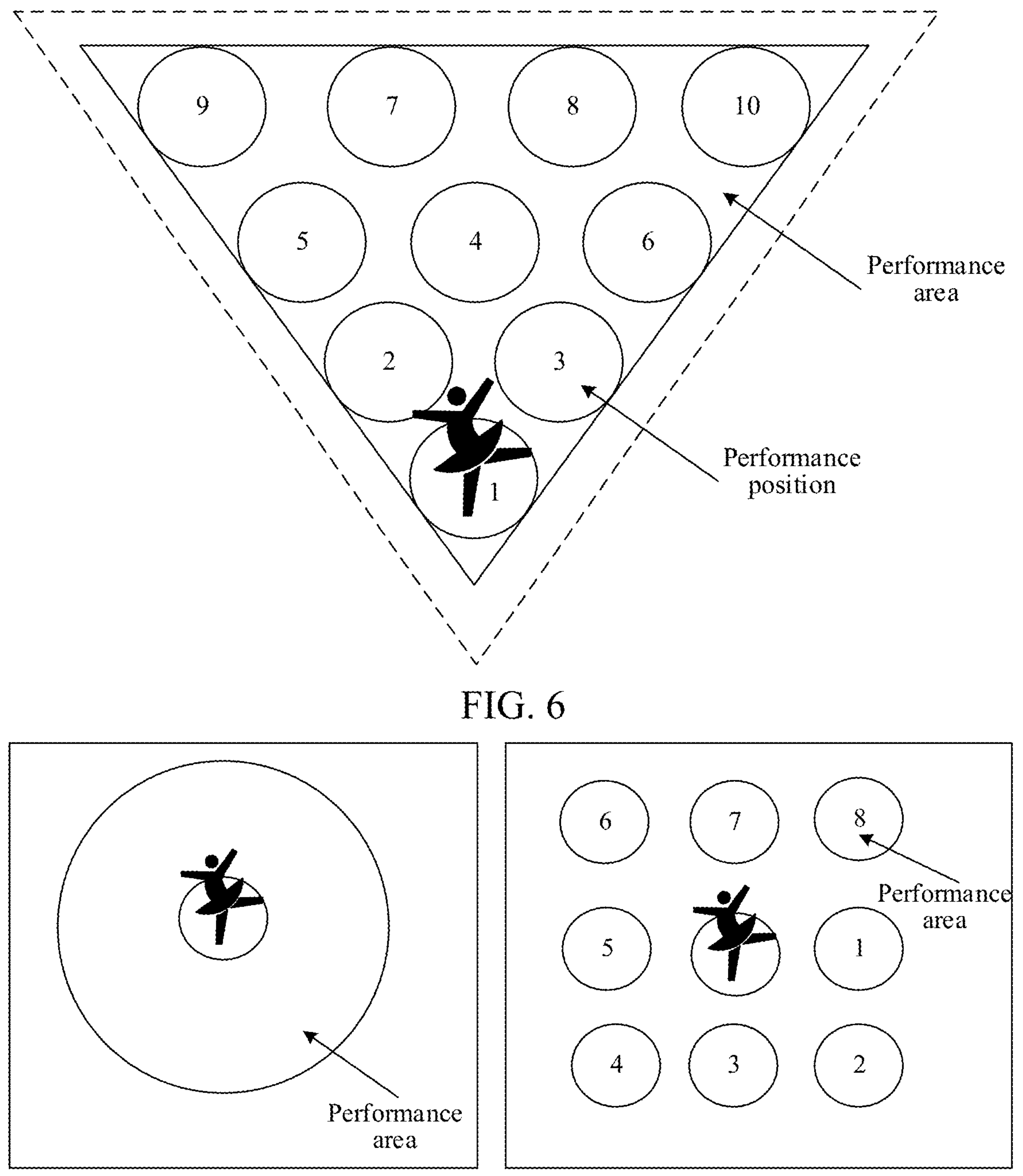
FIG. 6 is a schematic diagram of composition of a performance area according to an embodiment of this application.
FIG. 7 is a schematic diagram of a performance sensing area according to an embodiment of this application.

In actual application, the terminal may present a performance area including at least two performance positions. The at least two performance positions are arranged in an arrangement manner of a matrix, and the matrix forms a target shape, such as a triangle, a square, a rectangle, a circle, a polygon, and the like. As an example, FIG. 6 is a schematic diagram of composition of a performance area according to an embodiment of this application. The performance area includes 10 performance positions, and position numbers are 1 to 10 respectively. As shown in FIG. 6, the 10 performance positions are arranged in an arrangement manner of a triangular matrix.

In the foregoing embodiment, a plurality of performance positions included in the performance area are arranged in an arrangement manner of the matrix, so that the matrix may form a target shape. In this way, an aesthetic degree is added to display of the performance position, making a target performance more appreciable, enabling a user who joins a virtual scene to watch a better target performance, and improving a scene effect of the virtual scene and a sense of immersion of the user; and a display layout of the performance position is properly planned, to improve utilization of device display resources.

Step 102: Control, in response to a movement control instruction for the first virtual object, the first virtual object to move in the virtual scene.

In the embodiments of this application, when at least one second virtual object in an action execution state of the target performance is displayed in the virtual scene, the user may implement an effect of controlling the first virtual object to automatically perform an action of the target performance by controlling the first virtual object to move to a position that meets an execution condition of the target performance. Therefore, when receiving the movement control instruction for the first virtual object, the terminal controls, in response to the movement control instruction the first virtual object, to move in the virtual scene.

Step 103: During movement of the first virtual object, control, when a position of the first virtual object meets an execution condition of the target performance, the first virtual object to automatically perform the action of the target performance.

In actual application, in a process of controlling the first virtual object to move, the terminal may determine in real time or periodically whether the position of the first virtual object meets the execution condition of the target performance. The first virtual object is controlled to automatically perform the action of the target performance when it is determined that the position of the first virtual object meets the execution condition of the target performance.

An action execution progress of the first virtual object for the target performance may be synchronized or asynchronous with an action execution progress of each second virtual object for the target performance. When the action execution progress of the first virtual object for the target performance is synchronized with the action execution progress of each second virtual object for the target performance, a plurality of virtual objects (including a first virtual object and at least one second virtual object) may simultaneously perform the action of the target performance.

In actual implementation, the first virtual object may be controlled to automatically perform the action of the target performance at the current position, or the first virtual object may be controlled to automatically perform the action of the target performance at the performance position in a specific performance area.

In some embodiments, the terminal may determine whether the position of the first virtual object meets the execution condition of the target performance in the following manner: during movement of the first virtual object, obtaining a distance between the first virtual object and any second virtual object; and determining, when the distance is less than a distance threshold, that the position of the first virtual object meets the execution condition of the target performance.

In actual application, during movement of the first virtual object, the terminal may obtain the distance between the first virtual object and any second virtual object in real time or periodically. When the distance between at least one second virtual object and the first virtual object is lower than the distance threshold, it is determined that the position of the first virtual object meets the execution condition of the target performance.

In the foregoing embodiment, the user may achieve a control purpose of controlling the first virtual object to automatically perform the action of the target performance by controlling the first virtual object to be close to the second virtual object that is in the action execution state of the target performance. A quantity times of man-machine interaction to achieve the control purpose is reduced, and the implemented algorithm logic is simple. Fewer computing resources are occupied, occupation of device processing resources is reduced, and utilization of device processing resources is improved.

In some embodiments, the at least one second virtual object includes an initiating object of the target performance. In this case, the terminal may present a performance sensing area corresponding to the initiating object; and correspondingly, the terminal may determine whether a position of the first virtual object meets the execution condition of the target performance in the following manner: during movement of the first virtual object, determining, when the first virtual object moves onto the performance sensing area, that the position of the first virtual object meets the execution condition of the target performance.

In actual application, the at least one second virtual object includes the initiating object of the target performance. In this case, the terminal may present the performance sensing area corresponding to the initiating object. The performance sensing area may be an area centered on the initiating object and having a target shape, such as a circular area, a square area, a triangular area, a polygonal area, and the like; and in another example, the performance sensing area may further not include an area in which the initiating object is located. In other words, the performance sensing area may be at least one area surrounding the initiating object and associated with the initiating object. The at least one area and the area in which the initiating object is located may be arranged in an arrangement manner of a matrix, to form a matrix in a target shape.

As an example, FIG. 7 is a schematic diagram of a performance sensing area according to an embodiment of this application. As shown in (1) in FIG. 7, the performance sensing area is a circular area centered on an initiating object; and as shown in (2) in FIG. 7, the performance sensing area includes eight circular areas (a circular area 1 to 8) located surrounding the initiating object. The eight circular areas and the area in which the initiating object is located are arranged in an arrangement manner of a square matrix.

Correspondingly, during movement of a first virtual object, the terminal obtains in real time and periodically determines whether a position of the first virtual object is located in the performance sensing area corresponding to the initiating object. If yes, the terminal determines, when the first virtual object moves onto the performance sensing area, that the position of the first virtual object meets an execution condition of a target performance.

In the foregoing embodiment, by setting a corresponding performance sensing area for an initiating object of the target performance, the first virtual object may automatically perform an action of the target performance when moving to the performance sensing area. In this way, it may be ensured that a performance area of the target performance is based on the initiating object of the target performance, to increase enthusiasm of a user, as the initiating object, to initiate the target performance in a virtual scene, and increase possibility of interaction between the initiating object and a joining object of the target performance; and by only maintaining one performance sensing area for the initiating object and detecting whether the first virtual object is in the performance sensing area, a control purpose of allowing the user to control the first virtual object to move to the performance sensing area, to control the first virtual object to automatically perform the action of the target performance may be achieved. The implemented algorithm logic is simple, fewer computing resources are occupied, occupation of device processing resources is reduced, and utilization of device processing resources is improved.

In some embodiments, the target performance has a corresponding performance object quantity threshold; and the terminal may control the first virtual object to automatically perform the action of the target performance in the following manner: controlling, when the position of the first virtual object meets the execution condition of the target performance, and an object quantity of the second virtual object does not reach the performance object quantity threshold, the first virtual object to automatically perform the action of the target performance.

In actual application, for the target performance, a corresponding performance object quantity threshold may be set. When determining that the position of the first virtual object meets the execution condition of the target performance, the terminal first obtains the object quantity of second virtual objects, and then determines whether the object quantity of second virtual objects reaches the performance object quantity threshold. When it is determined that the object quantity of second virtual objects does not reach the performance object quantity threshold, the first virtual object is controlled to join the target performance, to control the first virtual object to automatically perform the action of the target performance; and when it is determined that the object quantity of second virtual objects reaches the performance object quantity threshold, the terminal may present prompt information, to prompt the user that a quantity of virtual objects that join the target performance has reached an upper limit and that the user cannot currently join the target performance.

In the foregoing embodiment, a proper performance object quantity threshold may be set for the target performance, to control unlimited users to join the target performance, and may support a specific quantity of performance objects to perform. Device processing resources of a device supporting a function of the target performance are properly allocated, to improve utilization of the device processing resources.

In some embodiments, the terminal may control the first virtual object to automatically perform the action of the target performance in the following manner: presenting a joining prompt control corresponding to the target performance when the position of the first virtual object meets the execution condition of the target performance, where the joining prompt control is used for confirming whether to join the target performance; and controlling, in response to a joining confirmation instruction that is triggered based on the joining prompt control, the first virtual object to join the target performance, and controlling the first virtual object to automatically perform the action of the target performance.

In actual application, a joining prompt control corresponding to the target performance may be further presented when the position of the first virtual object meets the execution condition of the target performance, to prompt the user to confirm whether to join the target performance. The joining prompt control includes a confirmation function item used for triggering a joining confirmation instruction, and a rejection function item used for triggering a refuse-to-join instruction. When the user triggers the joining confirmation instruction based on the joining prompt control, for example, when a trigger operation for the confirmation function item is received, the first virtual object is controlled to join the target performance, and the first virtual object is controlled to automatically perform the action of the target performance.

Figure 8:
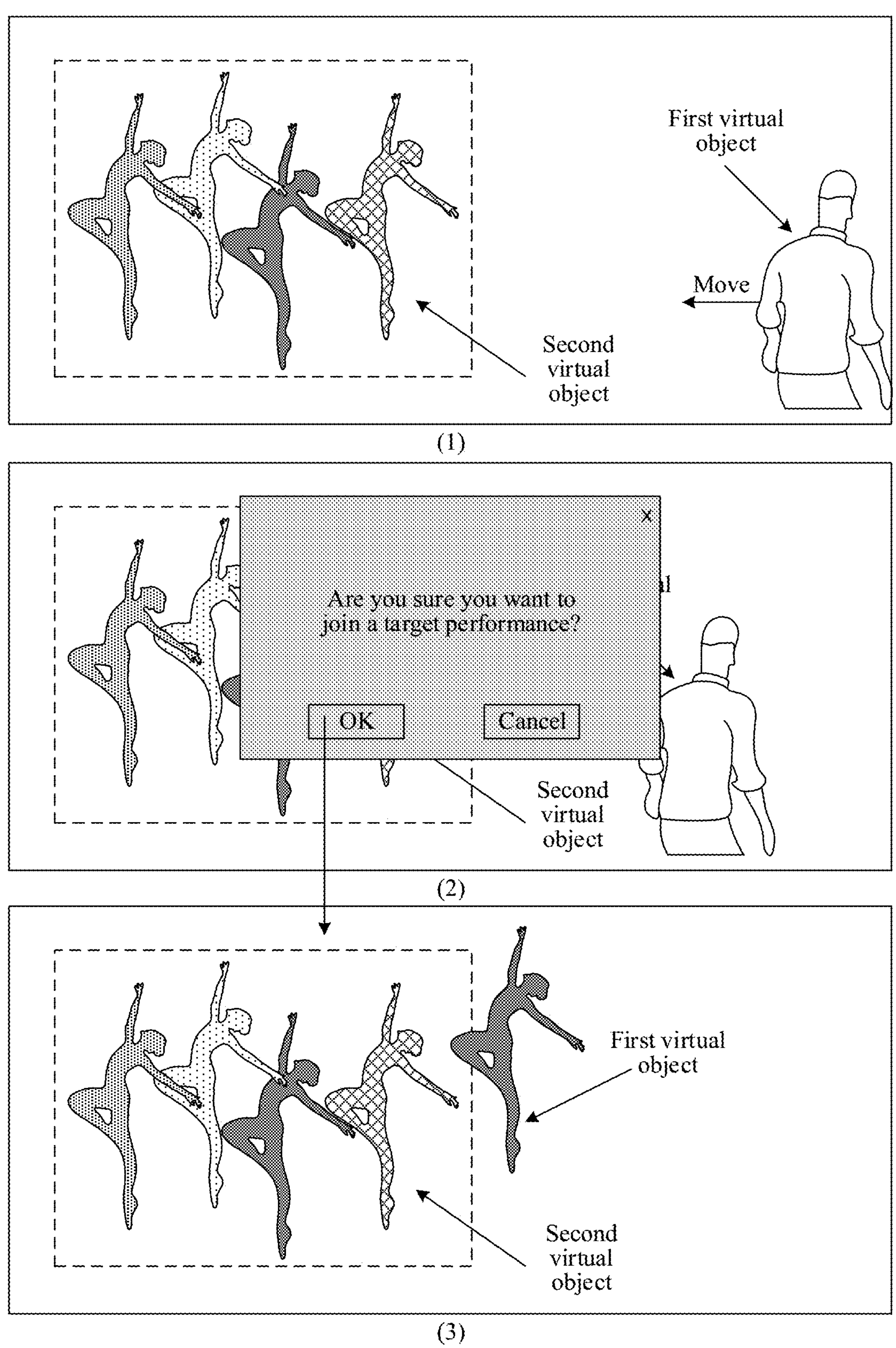
FIG. 8 is a schematic flowchart of a first virtual object joining a target performance according to an embodiment of this application.

As an example, FIG. 8 is a schematic flowchart of a first virtual object joining a target performance according to an embodiment of this application. A terminal displays the first virtual object and four second virtual objects in an action execution state of the target performance, as shown in (1) in FIG. 8; when the first virtual object is controlled to move to a position at which a distance from any second virtual object is lower than a distance threshold, an execution condition of the target performance is met. In this case, the terminal presents a joining prompt control, to be specific, displays prompt information "Are you sure you want to join a target performance?", and displays a confirmation function item "OK" associated with the prompt information used for triggering a joining confirmation instruction, and a rejection function item "Cancel" used for triggering a refuse-to-join instruction, as shown in (2) in FIG. 8; and in response to the trigger operation of "OK" for the confirmation function item, it indicates that the joining confirmation instruction is triggered based on a user joining prompt control. In this case, the first virtual object is controlled to join the target performance, to control the first virtual object to automatically perform an action of the target performance, as shown in (3) in FIG. 8.

In the foregoing embodiment, the first virtual object may automatically select whether to join the target performance, avoiding possibility that the user needs to participate in the target performance by controlling the first virtual object to trigger the execution condition by mistake, and improving user experience in a virtual scene.

In some embodiments, in response to the joining confirmation instruction that is triggered based on the joining prompt control, the terminal may control the first virtual object to join the target performance in the following manner: sending a performance joining request in response to the joining confirmation instruction that is triggered based on the joining prompt control, where the performance joining request is used for requesting to join the target performance; and controlling, in response to an allow-to-join instruction returned for the performance joining request, the first virtual object to join the target performance.

In actual application, after receiving the joining confirmation instruction, the terminal may further send a performance joining request corresponding to the first virtual object, for example, may send to any second virtual object, or may send to the initiating object (may be one virtual object in the at least one second virtual object, or may not be one virtual object in the at least one second virtual object) of the target performance. The joining request is used for requesting to join the target performance. When receiving the allow-to-join instruction for the performance joining request, the terminal may present prompt information used for prompting that the joining request has been passed, and control the first virtual object to join the target performance, to automatically perform the action of the target performance. When receiving the refuse-to-join instruction for the performance joining request, the terminal may present the prompt information used for prompting that the joining request has been refused, and keep a current state of the first virtual object unchanged.

In the foregoing embodiment, when the user controls the first virtual object to join the target performance, the user needs to obtain permission of the second virtual object. It is ensured that the second virtual object has the right and autonomy to select the virtual object to join the target performance when performing the target performance, improving performance experience of the user who has participated in the target performance in the virtual scene.

In some embodiments, the terminal may invite the target virtual object to join the target performance in the following manner: presenting an invitation function item corresponding to the target performance; sending, in response to an invitation instruction that is for a target virtual object and is triggered based on the invitation function item, an invitation request to a terminal corresponding to the target virtual object, where the invitation request is used for inviting the target virtual object to join the target performance; and presenting, when a confirmation instruction is received for the invitation request, the target virtual object that automatically performs the action of the target performance.

In actual application, the terminal may further invite the target virtual object to join the target performance. In this case, the terminal may present an invitation function item corresponding to the target performance, and send, when receiving an invitation instruction for the target virtual object that is triggered based on the invitation function item, an invitation request to a terminal corresponding to the target virtual object, where the invitation request is used for inviting the target virtual object to join the target performance. When the confirmation instruction is received for the invitation request, to be specific, the target virtual object agrees to join the target performance, the terminal presents the target virtual object that automatically performs the action of the target performance in this case.

In the foregoing embodiment, by providing the invitation function item of the target performance, the user may invite other users to participate in the target performance through the invitation function item, which improves interactivity and participation enthusiasm of the user.

In some embodiments, the terminal may control the first virtual object to exit the target performance in the following manner: presenting a performance exit function item of the target performance; and controlling, in response to a trigger operation for the performance exit function item, the first virtual object to stop automatically performing the action of the target performance.

Figure 9:
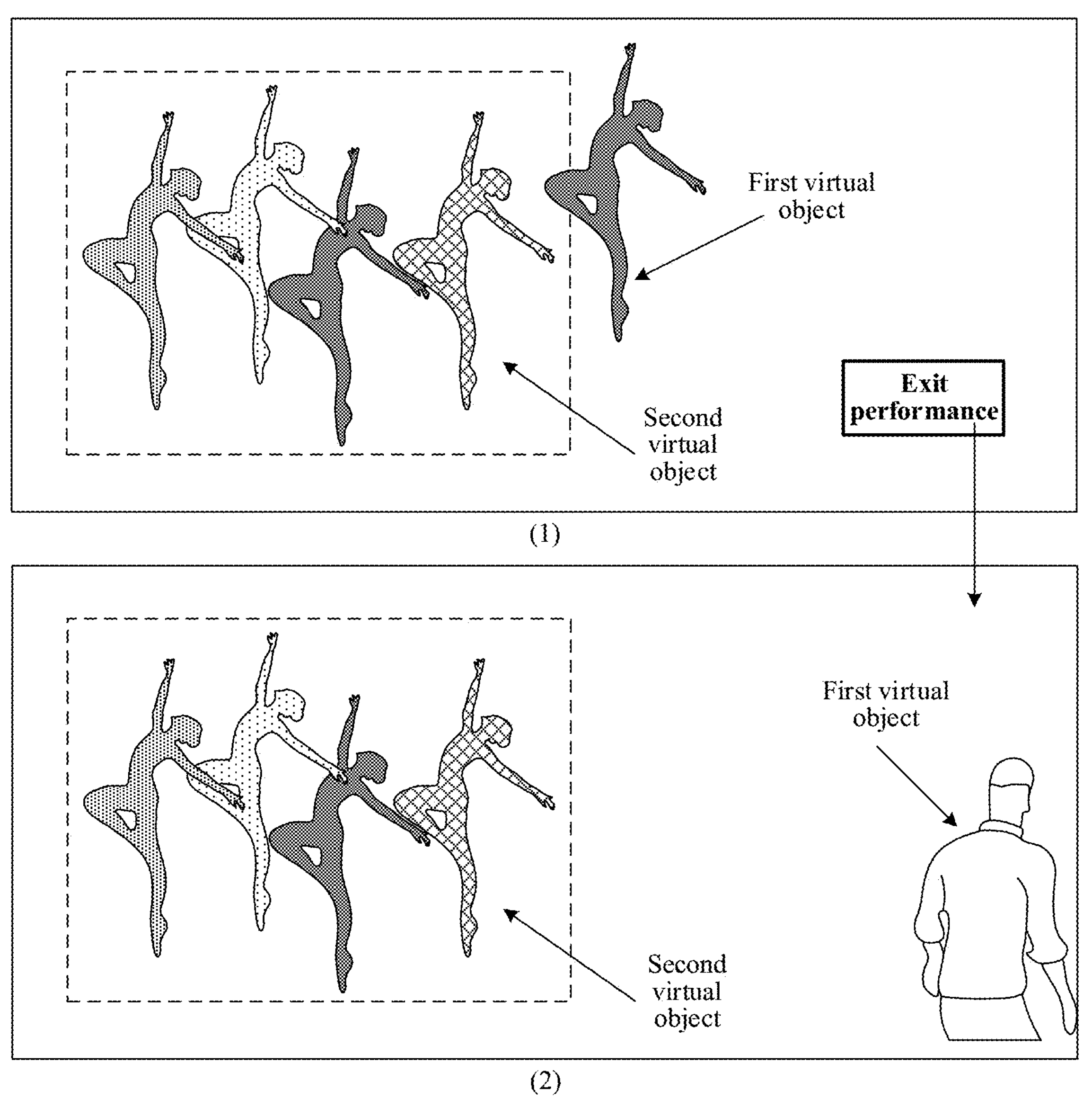
FIG. 9 is a schematic flowchart of a first virtual object exiting a target performance according to an embodiment of this application.

In actual application, after the terminal controls the first virtual object to join the target performance, to be specific, when the first virtual object is controlled to automatically perform the action of the target performance, the terminal may display the performance exit function item. When receiving the trigger operation for the performance exit function item, the first virtual object is controlled to exit the action execution state of the target performance. As an example, FIG. 9 is a schematic flowchart of a first virtual object exiting a target performance according to an embodiment of this application. A terminal displays a first virtual object and a second virtual object that perform an action of a target performance, and displays a performance exit function item of "exit performance" of the target performance, as shown in (1) in FIG. 9; and in response to a trigger operation for the performance exit function item of "exit performance", the first virtual object is controlled to stop performing an action of the target performance. In this case, the terminal displays a second virtual object in an action execution state of the target performance and the first virtual object that stops performing the action of the target performance, as shown in (2) in FIG. 9.

In the foregoing embodiment, by providing the performance exit function item, a user may select to exit the performance at any time as required, and provide user experience in a virtual scene.

In some embodiments, after the first virtual object exits the target performance, by using the first virtual object as an initiator, the terminal may initiate a target candidate performance in the following manner: presenting a performance function item; presenting, in response to a trigger operation for the performance function item, a selection control of at least one candidate performance, where the candidate performance includes at least one action; and controlling, in response to a selection operation that is for a target candidate performance and is triggered based on the selection control, the first virtual object to be in an action execution state of the target candidate performance, where the action execution state of the target candidate performance is used for indicating that the first virtual object performs at least one action included in the target candidate performance.

In actual application, after the first virtual object exits the target performance, the first virtual object may be further controlled as the initiating object to initiate the performance. Specifically, the terminal presents the performance function item, and presents, in response to the trigger operation for the performance function item, a selection control of at least one candidate performance for selection, where each candidate performance includes at least one action. When a selection operation that is for a target candidate performance and is triggered based on the selection control is received, in response to the selection operation, the first virtual object is controlled to be in the action execution state of the target candidate performance, to be specific, the first virtual object is controlled to perform the action of the target candidate performance. In actual application, the first virtual object may be controlled to automatically perform the action of the target performance, or may be an action of controlling the first virtual object to perform the target candidate performance according to an operation of the user.

In some embodiments, the terminal may present the selection control of the at least one candidate performance in the following manner: presenting the selection control of the at least one candidate performance in an active state; and correspondingly, the terminal may activate the selection control of the at least one candidate performance in the following manner: for each candidate performance, respectively performing the following processing: obtaining an interaction attribute of the first virtual object; and when the interaction attribute meets a performance activation condition corresponding to the candidate performance, activating a selection control of the candidate performance, so that the selection control of the candidate performance is in the active state.

In actual application, the terminal may present the selection control of the at least one candidate performance in the active state. In actual implementation, a selection control of each candidate performance may be activated in the following manner: obtaining the interaction attribute of the first virtual object, where the interaction attribute may include an interaction score (such as a quantity of virtual objects killed by the interaction, and whether an interaction result is victory or failure) and an interaction level (for example, a level of an account corresponding to the first virtual object, a level of an interaction result obtained through the interaction, and the like) of the first virtual object. When the interaction attribute meets a performance activation condition corresponding to the candidate performance, the selection control of the performance is activated, so that the selection control of the candidate performance is in the active state, and the selection control in the active state indicates that the corresponding candidate performance may be selected to initiate the corresponding performance.

Figure 10:
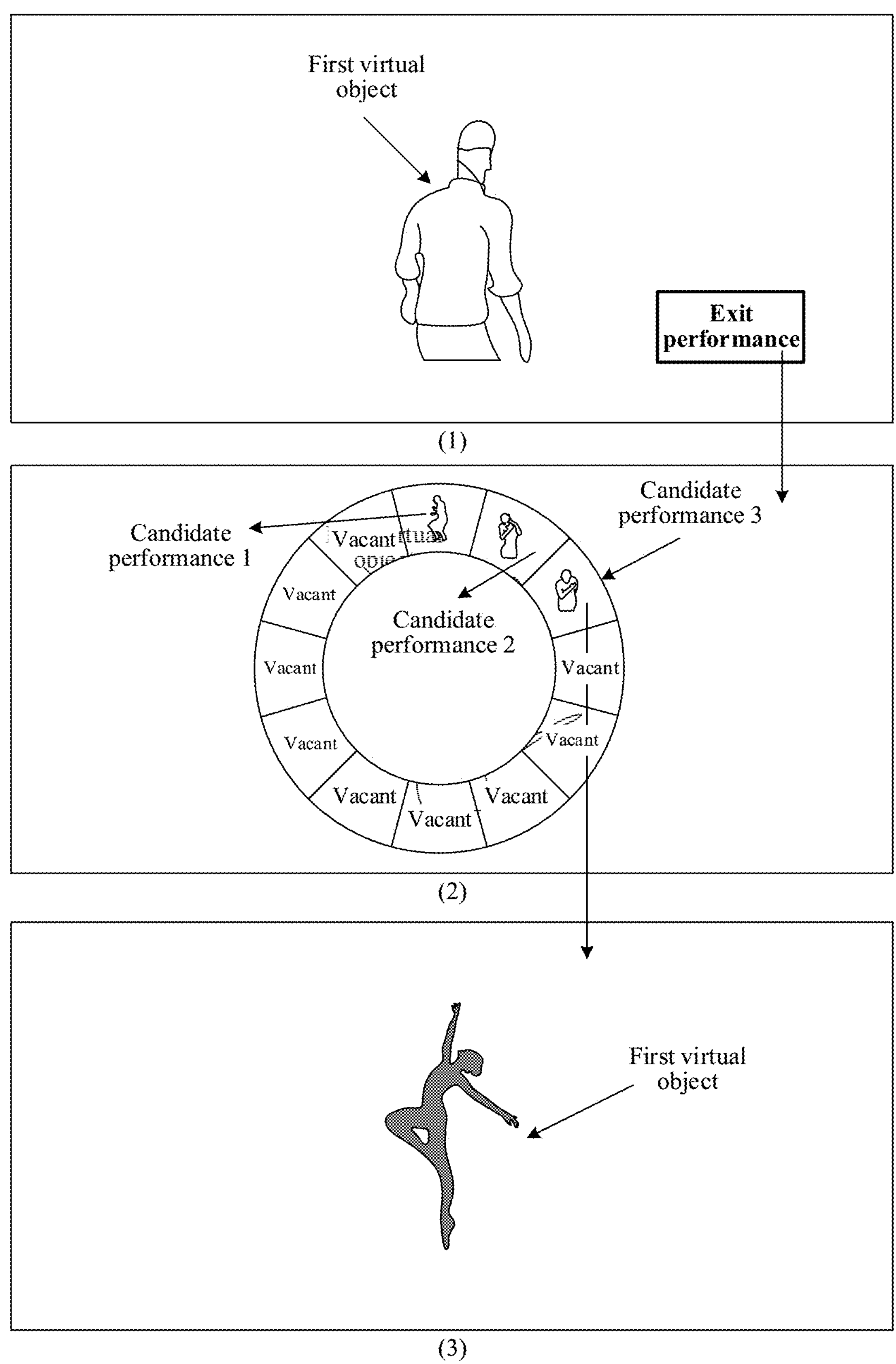
FIG. 10 is a schematic diagram of an initiation procedure of a target candidate performance according to an embodiment of this application.

As an example, FIG. 10 is a schematic diagram of an initiation procedure of a target candidate performance according to an embodiment of this application. A terminal displays a performance function item "performance", as shown in (1) in FIG. 10; in response to a trigger operation for the performance function item "performance", a selection control of at least one candidate performance is presented. The selection control of the at least one candidate performance is displayed in a style of a roulette, and a selection control of each candidate performance is in an active state, including a candidate performance 1 to a candidate performance 3, as shown in (2) in FIG. 10; and in response to a trigger operation of the selection control for the "candidate performance 3", the "candidate performance 3" is determined as a target candidate performance. In this case, a first virtual object is controlled to be in an action execution state of the target candidate performance "candidate performance 3", to be specific, an action of the "candidate performance 3" is automatically performed, as shown in (3) in FIG. 10.

In the foregoing embodiment, by providing a performance function item and providing an activation condition for the performance function item, interaction enthusiasm of a user in a virtual scene may be improved, and waste of hardware resources of a device that supports and maintains the virtual scene may be reduced.

In some embodiments, the terminal may control the first virtual object to be in the action execution state of the target candidate performance in the following manner: creating and presenting a performance area corresponding to the target candidate performance by using a position of the first virtual object as a reference position; and controlling the first virtual object to automatically perform an action of the target candidate performance at the reference position in the performance area, to be in the action execution state of the target candidate.

In actual application, when the terminal controls the first virtual object to be in the action execution state of the target candidate performance, first, the position of the first virtual object is used as the reference position, the performance area corresponding to the target candidate area is created and presented. The performance area includes the reference position and may have a target shape (such as a square, a rectangle, a triangle, a polygon, a circle, and the like). As an example, the reference position may be a center of the performance area, or a vertex (such as a vertex of the triangle and a vertex of the square) of the performance area with a target shape, or any position (in other words, the performance area includes the reference position) in the performance area. After the performance area is created, the first virtual object is controlled to automatically perform the action of the target candidate performance at the reference position in the performance area, to be in the action execution state of the target candidate performance.

In some embodiments, the performance area includes at least one performance position. When a position of a third virtual object meets an execution condition of the target candidate performance, the terminal presents the third virtual object at a target performance position of the at least one performance position, where the third virtual object automatically performs the action of the target candidate performance.

In actual application, after creating the performance area for the target candidate performance, at least one performance position may be further created in the performance area. When there are a plurality of performance positions, if the position of the third virtual object meets the execution condition of the target candidate performance, the third virtual object that automatically performs the action of the target candidate performance is presented at the target performance position of the at least one performance position.

In some embodiments, the terminal controls, when a movement instruction for the first virtual object is received, the first virtual object to move in the virtual scene and controls the performance area to synchronously move with the first virtual object.

Figure 12:
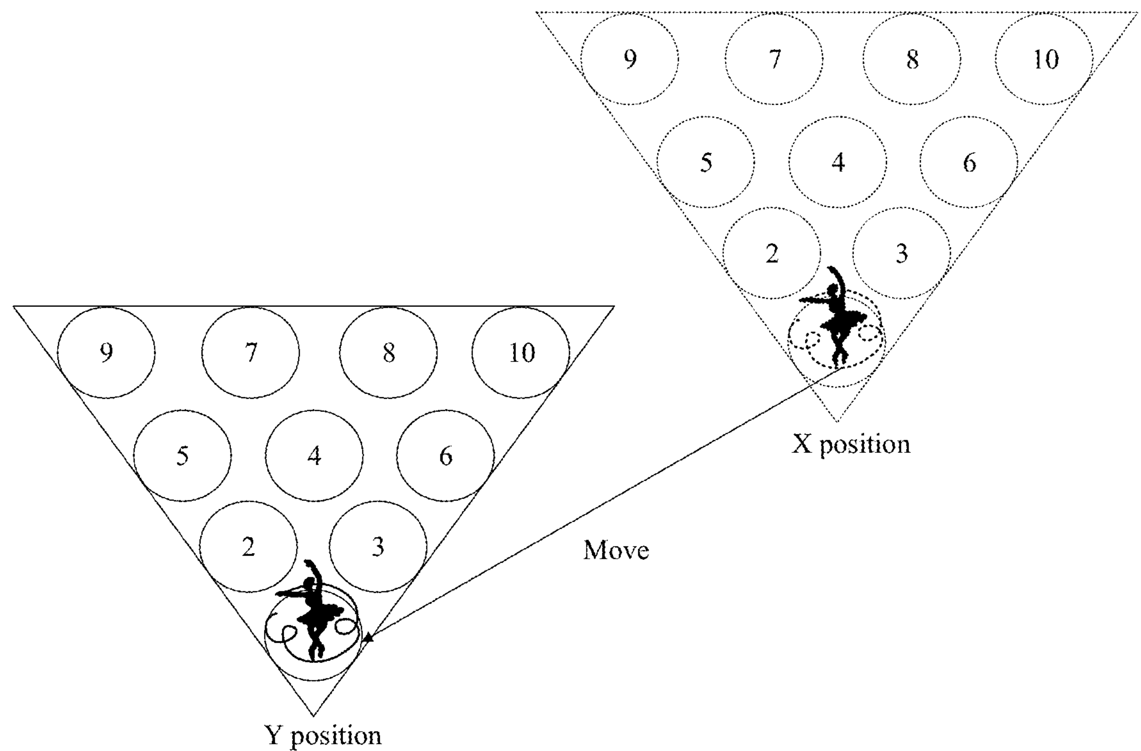
FIG. 12 is a schematic diagram of mobile display of a performance area of a target candidate performance according to an embodiment of this application.

As an example, FIG. 12 is a schematic diagram of mobile display of a performance area of a target candidate performance according to an embodiment of this application. The performance area of the target candidate performance is a triangle performance area. A first virtual object is at an X position, which is a vertex of the triangle performance area; and when the first virtual object moves from the X position to a Y position, the performance area of the target candidate performance moves synchronously with the first virtual object. After a movement process, a relative position relationship between the first virtual object and the performance area of the target candidate performance keeps unchanged.

In the foregoing embodiment, by using the first virtual object as a reference, a corresponding performance area and performance position are set for the target candidate performance initiated by the first virtual object, so that a virtual object joining the target candidate performance is displayed under a proper display layout. This not only improves utilization of device display resources, but also improves viewability of the target candidate performance, allowing the user who joins the virtual scene to watch a better target candidate performance, and improving a scene effect of the virtual scene and a sense of immersion of the user. In addition, the performance area uses the first virtual object as a reference, and may move along with the first virtual object, thereby increasing enthusiasm of the user as an initiator to initiate the target candidate performance in the virtual scene, and increasing possibility of interaction between an initiator and a participant participating in the target candidate performance.

In some embodiments, the terminal may create, by using a position of the first virtual object as a reference position, a performance area corresponding to the target candidate performance in the following manner: determining, by using the position of the first virtual object as the reference position, a target area including the reference position, and performing obstacle detection on the target area, to obtain a detection result; determining that the target area is the performance area corresponding to the target candidate performance when the detection result indicates that there is no obstacle in the target area; and correspondingly, the terminal presents, when the detection result indicates that the obstacle exists in the target area, prompt information used for indicating that the performance area is not creatable at the position of the first virtual object.

In actual application, the terminal may first use the position of the first virtual object as the reference position, to determine the target area including the reference position. The target area may have a target shape (such as a square, a rectangle, a triangle, a polygon, a circle, and the like). As an example, the reference position may be a center of the target area, or a vertex (such as a vertex of the triangle and a vertex of the square) of the target area with a target shape, or any position (in other words, the target area includes the reference position) in the performance area.

Then, obstacle detection is performed on the target area, to obtain the detection result, to be specific, whether an obstacle is included in the target area is detected. In actual implementation, a collision box may be arranged in the virtual object in the virtual scene, and whether the target area includes an obstacle is determined by whether the collision box may be detected. Determining that the target area is the performance area corresponding to the target candidate performance when the detection result indicates that there is no obstacle in the target area; and the terminal may present, when the detection result indicates that the obstacle exists in the target area, prompt information used for indicating that the performance area is not creatable at the position of the first virtual object. For example, "the performance area cannot be created for performance at the current position."

Figure 11:
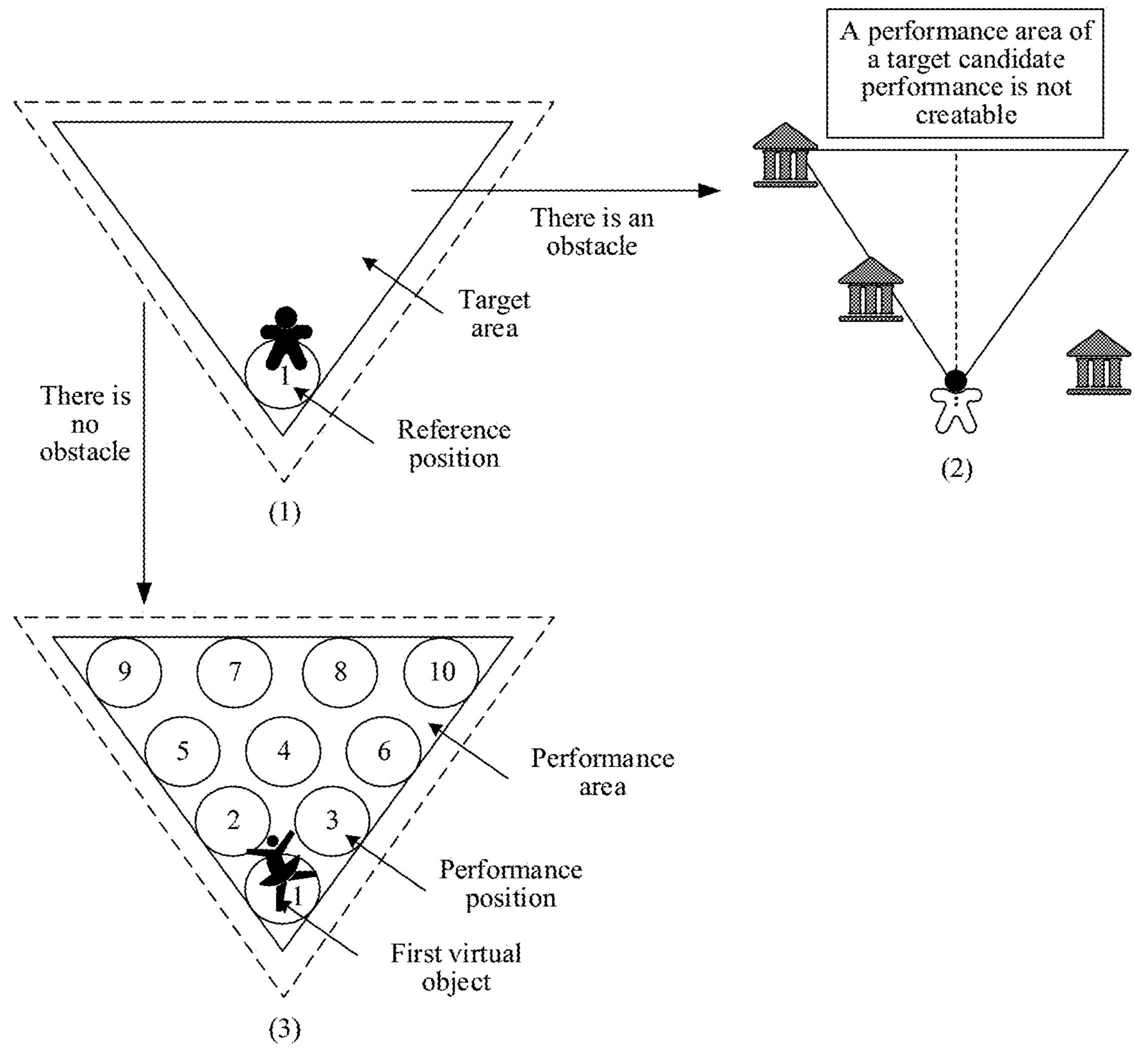
FIG. 11 is a schematic diagram of creating a performance area for a target candidate performance according to an embodiment of this application.

As an example, FIG. 11 is a schematic diagram of creating a performance area for a target candidate performance according to an embodiment of this application. A position of a first virtual object of a terminal is a reference position, and a target area including the reference position is determined, namely, a triangular target area, and the reference position is a vertex of the triangular target area, as shown in (1) in FIG. 11; the terminal performs obstacle detection on the target area, to obtain a detection result; the terminal presents, when the detection result indicates that the obstacle exists in the target area, prompt information that "the performance area of the target candidate performance is not creatable" used for indicating that the performance area is not creatable at the position of the first virtual object, as shown in (2) in FIG. 11; when the detection result indicates that the obstacle does not exist in the target area, the terminal determines that the target area is a performance area corresponding to the target candidate performance, and creates a plurality of performance positions in the performance area, as shown in (3) in FIG. 11, includes 10 performance positions; and in addition, still referring to (3) in FIG. 11, the first virtual object is further controlled to join the target candidate performance. In other words, the first virtual object in the action execution state of the target candidate performance is displayed at the performance position with a position number of "1".

In the embodiments of this application, in a virtual scene, there is a first virtual object and at least one second virtual object that is in an action execution state of a target performance, where the target performance includes at least one action, and the action execution state of the target performance is used for indicating that the second virtual object performs the action of the target performance; and in a process of controlling the first virtual object to move in the virtual scene, if a position of the first virtual object meets an execution condition of the target performance, the first virtual object is controlled to automatically perform the action of the target performance. In this way, in the virtual scene in which the second virtual object is in the action execution state of the target performance, only by controlling the first virtual object to move to a position that meets the execution condition of the target performance, a control purpose of controlling the first virtual object to automatically perform the action of the target performance may be achieved. This may reduce a quantity of man-machine interactions required to achieve the control purpose, thereby improving efficiency of man-machine interaction and utilization of hardware processing resources.

An example in which the virtual scene is used as the game scene is used. The following describes an exemplary application of this embodiment of this application in an actual application scenario.

In related technologies, when controlling the virtual object in the virtual scene to perform performance (such as dance and martial arts) actions, the user needs to continuously and repeatedly perform operations such as tapping, touch-and-hold, sliding, and the like to implement; and when a plurality of users control virtual objects to jointly perform, all users need to synchronously complete an instruction through an operation such as tapping, touch-and-hold, or sliding. In this way, the operation is complicated and efficiency of man-machine interaction is low, and when one of the users makes an operation error, an effect of joint performance cannot be implemented.

Based on this, the embodiments of this application provide a method for controlling a virtual object to at least resolve the foregoing existing problems. In the embodiments of this application, after a performance initiator (such as the first virtual object) starts to perform the action of the target performance, the third virtual object may automatically and jointly perform the action of the target performance with the first virtual object by moving to the target position (a distance between the target position and the position of the first virtual object is lower than a distance threshold), to synchronously perform with the first virtual object; and when a distance between the fourth virtual object and any one of the first virtual object or the second virtual object is lower than the distance threshold, the action of the target performance may also be automatically and jointly performed with the first virtual object and the third virtual object. The operation is simple, thereby improving efficiency of man-machine interaction, and avoiding a case that a joint performance is forced to terminate due to an operation error made by the user.

Figure 13:
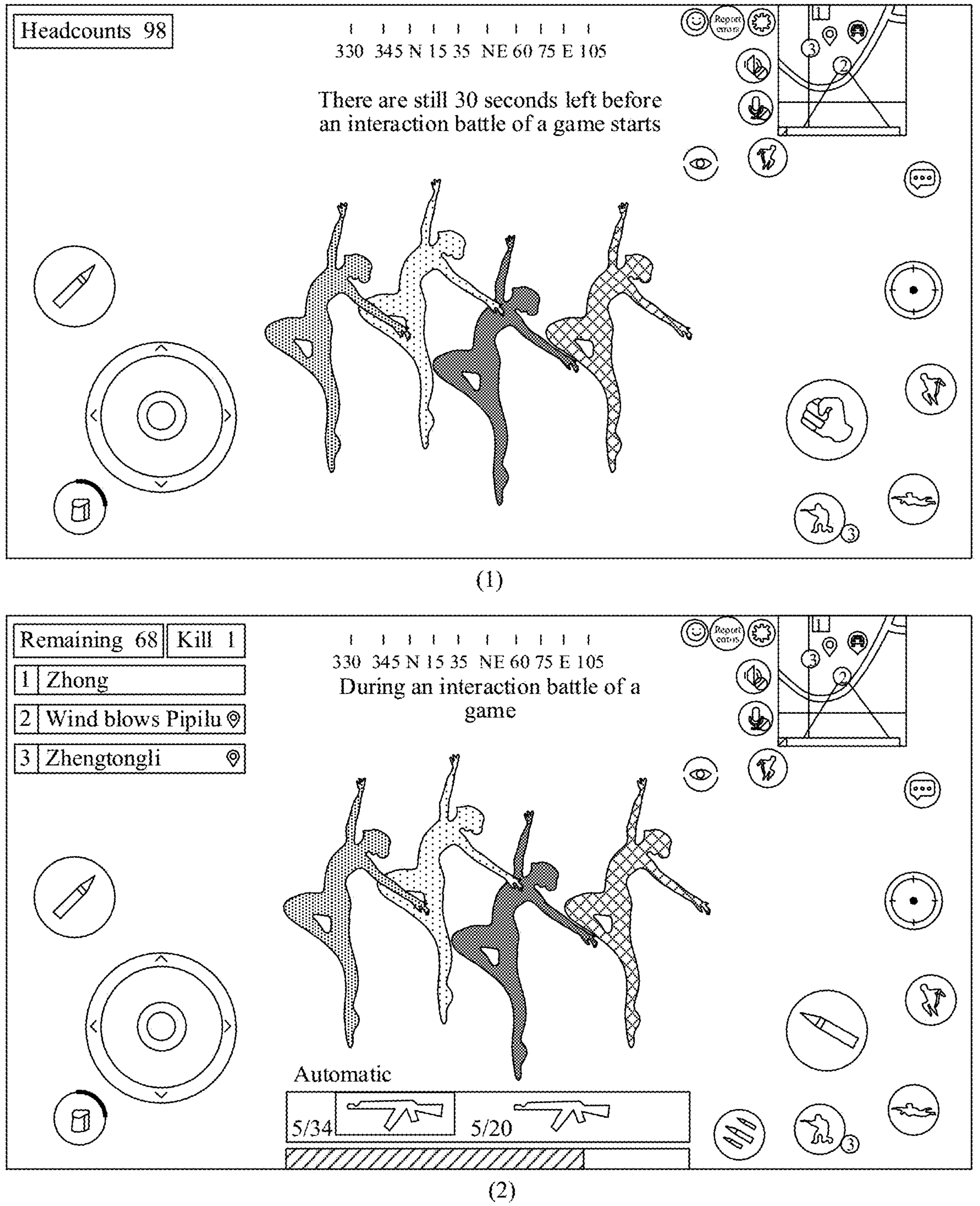
FIG. 13 is a schematic diagram of an application scenario of a method for controlling a virtual object according to an embodiment of this application.

FIG. 13 is a schematic diagram of an application scenario of a method for controlling a virtual object according to an embodiment of this application. As shown in (1) in FIG. 13, before an interaction battle of a game starts, a plurality of virtual objects jointly perform an action of a target performance; and as shown in (2) in FIG. 13, during the interaction battle of the game, the plurality of virtual objects jointly perform the action of the target performance.

First, from a product side, the method for controlling the virtual object provided in this embodiment of this application is described, including:

initiation of the target performance: (1) a performance initiator (namely, a first virtual object) selects a to-be-initiated target performance (the target performance includes a plurality of actions) through a performance wheel (including a plurality of candidate performances). In actual implementation, the target performance may be obtained through an interaction level of the first virtual object (such as a level of a user account corresponding to the first virtual object), or may also be obtained by participating in an interaction battle in the virtual scene.

(2) One performance area is formed by using the first virtual object as a reference point. If there is an obstacle in the performance area, a performance initiator cannot use the selected target performance. If there is no obstacle in the performance area, the selected target performance is used, to generate a corresponding performance area. In addition, a plurality of performance positions are generated in the performance area, and each performance position has a corresponding position number. The plurality of performance positions are arranged in an arrangement manner of a matrix, and the matrix may be a triangle, a square, a rectangle, a circle, a polygon, and the like. The performance area may move synchronously with movement of the performance initiator (namely, the first virtual object).

Joining of the target performance: after the performance initiator (such as the first virtual object) starts to perform the action of the target performance, the third virtual object may automatically and jointly perform the action of the target performance with the first virtual object by moving to the target position (a distance between the target position and the position of the first virtual object is lower than the distance threshold), to synchronously perform with the first virtual object; and when a distance between the fourth virtual object and any one of the first virtual object or the second virtual object is lower than the distance threshold, the action of the target performance may also be automatically and jointly performed with the first virtual object and the third virtual object. The rest is deduced by analogy, until a quantity of virtual objects added to the target performance reaches an upper limit.

In actual application, the newly joined virtual object is added to a designated position for performance according to the position number of the performance position. In addition, the joiner may further send a joining request to the performance initiator, and join the target performance after being confirmed by the performance initiator.

Figure 14:
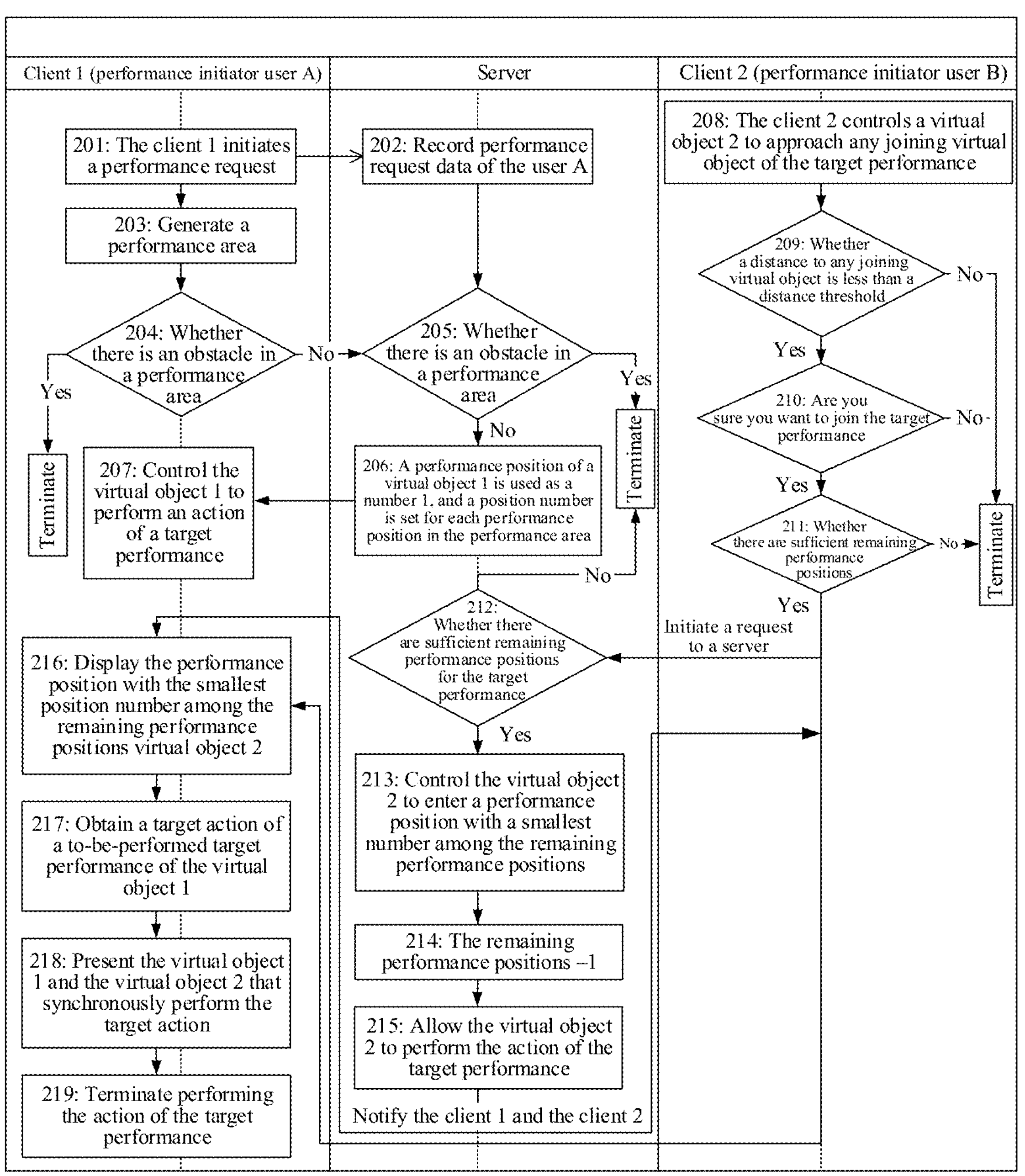
FIG. 14 is a schematic flowchart of a method for controlling a virtual object according to an embodiment of this application.

Then, the method for controlling a virtual object provided in this embodiment of this application is explained from a technical side. FIG. 14 is a schematic flowchart of a method for controlling a virtual object according to an embodiment of this application, including:

Step 201: A performance initiator (namely a user A, corresponding to a virtual object 1) initiates a target performance through a client 1, and the client 1 initiates a performance request of the target performance to a server.

Step 202: The server records performance request data of the user A.

Step 203: The client 1 generates a performance area of the user A.

Step 204: The client 1 determines whether there is an obstacle in the performance area. If yes, perform a termination operation; and if no, perform step 205.

Step 205: After determining that there is no obstacle in the performance area, the client 1 initiates a request to the server, and the server performs a second check, to be specific, determines whether there is an obstacle in the performance area again, and if yes, performs the termination operation; and if no, performs step 206.

Step 206: After the server determines that there is no obstacle in the performance area, a performance position of the virtual object 1 is used as a number 1, and different position numbers are set for performance positions in the performance area.

Step 207: The client 1 controls the virtual object 1 to perform an action of the target performance, and a client 2 synchronously presents an action of the virtual object 1 to perform the target performance.

Step 208: A performance joiner (namely, a user B, corresponding to a virtual object 2) controls the virtual object 2 to approach any joining virtual object of the target performance through the client 2.

Step 209: The client 2 determines whether a distance between the virtual object 2 and any joined virtual object of the target performance is less than a distance threshold. If no, perform a termination operation; and if yes, perform step 210.

Step 210: The client 2 determines that the distance is less than the distance threshold, and pops up joining prompt information corresponding to the target performance, to prompt whether to confirm joining the target performance. If no, perform the termination operation; and if yes, perform step 211.

Step 211: The client 1 determines whether remaining performance positions of the target performance are sufficient. If no, perform the termination operation; and if yes, perform step 212.

Step 212: After determining that the remaining performance positions are sufficient, the client 1 initiates a request to the server, to perform a second check, to be specific, to determine whether the remaining performance positions of the target performance are sufficient. If no, perform the termination operation; and if yes, perform step 213.

Step 213: After the server determines that the remaining performance positions are sufficient, a performance joiner is allowed to join the target performance, and the client 2 controls the virtual object 2 to enter a performance position with a smallest position number among the remaining performance positions.

A position number of the performance position of the third virtual object may be in a one-to-one correspondence with a joining order of the virtual object 2. If the position number ranges from 1 to N, a joining order also ranges from 1 to N, where N is an integer greater than 1.

Step 214: The server refreshes performance data of the user A, and the remaining performance position is −1.

Step 215: The server allows a virtual object 3 to perform an action of the target performance.

Step 216: After allowing the performance joiner to join the target performance, all clients (including the client 1 and the client 2) present the virtual object 2 at the performance position with the smallest position number among the remaining performance positions.

Step 217: All clients (including the client 1 and the client 2) obtain a target action of the target performance to be performed by the virtual object 1.

Step 218: All clients (including the client 1 and the client 2) present the virtual object 1 and the virtual object 2 that synchronously perform the target action.

Step 219: When the target performance stops, control terminating an action of performing the target performance.

In the embodiments of this application, in the virtual scene in which the second virtual object is in the action execution state of the target performance, only by controlling the first virtual object to move to a position that meets the execution condition of the target performance, the first virtual object may automatically perform the action of the target performance. This reduces a quantity of interactions required to achieve the control purpose, thereby improving efficiency of man-machine interaction and utilization of hardware processing resources; and content experienced by the user is also enriched in the virtual scene. An operating threshold is low, reducing a sense of frustration. The user may further process performance content, such as recording, editing, sharing, and the like, to increase the fun.

It is to be understood that in this embodiment of this application, related data such as user information is involved. When this embodiment of this application is applied to specific products or technologies, user permission or consent needs to be obtained, and the collection, use, and processing of related data comply with related laws, regulations, and standards of related countries and regions.

The following continues to describe an exemplary structure in which the apparatus 553 for controlling a virtual object provided in this embodiment of this application is implemented as a software module. In some embodiments, as shown in FIG. 2, a software module stored in the control apparatus 553 of the virtual object in the memory 550 may include: a presentation module 5531, configured to present a first virtual object in a virtual scene and at least one second virtual object in an action execution state of a target performance, where the target performance includes at least one action, and the action execution state of the target performance is used for indicating that the second virtual object performs an action of the target performance; a first control module 5532, configured to control, in response to a movement control instruction for the first virtual object, the first virtual object to move in the virtual scene; and a second control module 5533, configured to control, during movement of the first virtual object when a position of the first virtual object meets an execution condition of the target performance, the first virtual object to automatically perform the action of the target performance.

In some embodiments, the presentation module 5531 is further configured to present a performance area corresponding to the target performance, where the performance area includes at least one performance position; and present, at each performance position, the second virtual object in the action execution state of the target performance.

In some embodiments, each performance position has a corresponding position number; and the presentation module 5531 is further configured to obtain a joining order in which each second virtual object joins the target performance; and for each second virtual object, present the second virtual object in the action execution state of the target performance at a performance position indicated by a position number corresponding to the joining order of the second virtual object.

In some embodiments, when there are at least two performance positions, the presentation module 5531 is further configured to present a performance area including the at least two performance positions, where the at least two performance positions are arranged in an arrangement manner of a matrix, and the matrix forms a target shape.

In some embodiments, the target performance has a corresponding performance object quantity threshold; and the second control module 5533 is further configured to control, when the position of the first virtual object meets the execution condition of the target performance, and an object quantity of second virtual objects does not reach the performance object quantity threshold, the first virtual object to automatically perform the action of the target performance.

In some embodiments, the second control module 5533 is further configured to present a joining prompt control corresponding to the target performance when the position of the first virtual object meets the execution condition of the target performance, where the joining prompt control is used for confirming whether to join the target performance; and control, in response to a joining confirmation instruction that is triggered based on the joining prompt control, the first virtual object to join the target performance, and control the first virtual object to automatically perform the action of the target performance.

In some embodiments, the second control module 5533 is further configured to send a performance joining request in response to the joining confirmation instruction that is triggered based on the joining prompt control, where the performance joining request is used for requesting to join the target performance; and control, in response to an allow-to-join instruction returned for the performance joining request, the first virtual object to join the target performance.

In some embodiments, the second control module 5533 is further configured to obtain, during movement of the first virtual object, a distance between the first virtual object and any second virtual object; and determine, when the distance is less than a distance threshold, that the position of the first virtual object meets the execution condition of the target performance.

In some embodiments, the at least one second virtual object includes an initiating object of the target performance; and the presentation module 5531 is further configured to present a performance sensing area corresponding to the initiating object; and the second control module 5533 is further configured to determine, during movement of the first virtual object when the first virtual object moves onto the performance sensing area, that the position of the first virtual object meets the execution condition of the target performance.

In some embodiments, the second control module 5533 is further configured to present a performance exit function item of the target performance; and control, in response to a trigger operation for the performance exit function item, the first virtual object to stop automatically performing the action of the target performance.

In some embodiments, the presentation module 5531 is further configured to present an invitation function item corresponding to the target performance; send, in response to an invitation instruction that is for a target virtual object and is triggered based on the invitation function item, an invitation request to a terminal corresponding to the target virtual object, where the invitation request is used for inviting the target virtual object to join the target performance; and present, when a confirmation instruction is received for the invitation request, the target virtual object that automatically performs the action of the target performance.

In some embodiments, after the first virtual object exits the target performance, the second control module 5533 is further configured to present a performance function item; and present, in response to a trigger operation for the performance function item, a selection control of at least one candidate performance, where the candidate performance includes at least one action; and control, in response to a selection operation that is for a target candidate performance and is triggered based on the selection control, the first virtual object to be in an action execution state of the target candidate performance, where the action execution state of the target candidate performance is used for indicating that the first virtual object performs at least one action included in the target candidate performance.

In some embodiments, the second control module 5533 is further configured to create and present a performance area corresponding to the target candidate performance by using a position of the first virtual object as a reference position; and control the first virtual object to automatically perform an action of the target candidate performance at the reference position in the performance area.

In some embodiments, the performance area includes at least one performance position, and the second control module 5533 is further configured to present, when a position of a third virtual object meets an execution condition of the target candidate performance, the third virtual object at a target performance position of the at least one performance position, where the third virtual object automatically performs the action of the target candidate performance.

In some embodiments, the second control module 5533 is further configured to control, when a movement instruction for the first virtual object is received, the first virtual object to move in the virtual scene and control the performance area to synchronously move with the first virtual object.

In some embodiments, the second control module 5533 is further configured to determine and perform, by using the position of the first virtual object as the reference position, a target area including the reference position, obstacle detection on the target area, to obtain a detection result; and determine that the target area is the performance area corresponding to the target candidate performance when the detection result indicates that there is no obstacle in the target area; and the second control module 5533 is further configured to present, when the detection result indicates that the obstacle exists in the target area, prompt information used for indicating that the performance area is not creatable at the position of the first virtual object.

In some embodiments, the second control module 5533 is further configured to present a selection control of the at least one candidate performance in an active state; and the second control module 5533 is further configured to respectively perform, for each candidate performance, the following processing: obtain an interaction attribute of the first virtual object; and control the selection control of the candidate performance to be in the active state when the interaction attribute meets a performance activation condition corresponding to the candidate performance.

In the embodiments of this application, in a virtual scene, there are a first virtual object and at least one second virtual object that is in an action execution state of a target performance, where the target performance includes at least one action, and the action execution state of the target performance is used for indicating that the second virtual object performs the action of the target performance; and in a process of controlling the first virtual object to move in the virtual scene, if a position of the first virtual object meets an execution condition of the target performance, the first virtual object is controlled to automatically perform the action of the target performance. In this way, in the virtual scene in which the second virtual object is in the action execution state of the target performance, only by controlling the first virtual object to move to a position that meets the execution condition of the target performance, a control purpose of controlling the first virtual object to automatically perform the action of the target performance may be achieved. This may reduce a quantity of man-machine interactions required to achieve the control purpose, thereby improving efficiency of man-machine interaction and utilization of hardware processing resources.

An embodiment of this application further provides an electronic device, where the electronic device includes:

a memory, configured to store computer-executable instructions; and a processor, configured to implement the method for controlling a virtual object provided in this embodiment of this application when executing the computer-executable instructions stored in the memory.

An embodiment of this application further provides a computer program product or a computer program. The computer program product or the computer program includes computer-executable instructions. The computer-executable instructions are stored in a non-transitory computer-readable storage medium. A processor of a computer device reads the computer-executable instructions from the computer-readable storage medium. The processor executes the computer-executable instructions, to enable the computer device to perform the method for controlling a virtual object provided in this embodiment of this application.

An embodiment of this application further provides a non-transitory computer-readable storage medium storing computer-executable instructions, the computer-executable instructions, when executed by a processor, enabling the processor to perform the method for controlling a virtual object provided in this embodiment of this application.

In some embodiments, the computer-readable storage medium may be a memory such as an FRAM, a ROM, a PROM, an EPROM, an EEPROM, a flash memory, a magnetic memory, a compact disc, or a CD-ROM; or may be various devices including one of or any combination of the foregoing memories.

In some embodiments, the computer-executable instructions can be written in the form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

As an example, the computer-executable instructions may, but do not necessarily, correspond to a file in a file system, and may be stored in a part of a file that saves another program or other data, for example, be stored in one or more scripts in a Hyper Text Markup Language (HTML) file, stored in a file that is specially used for a program in discussion, or stored in a plurality of collaborative files (for example, be stored in files of one or more modules, subprograms, or code parts).

As an example, the computer-executable instructions may be deployed to be executed on a computing device, or deployed to be executed on a plurality of computing devices at the same location, or deployed to be executed on a plurality of computing devices that are distributed in a plurality of locations and interconnected by using a communication network.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit. The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. A method for controlling a virtual object in a virtual scene performed by an electronic device, the method comprising:

presenting, in the virtual scene, a first virtual object and a plurality of second virtual objects that are in an action execution state of a target performance, wherein the action execution state of the target performance indicates that the second virtual objects perform an identical action of the target performance in the virtual scene;

presenting, in the virtual scene, a performance area corresponding to the target performance, wherein the performance area comprises a matrix of performance positions;

presenting, at a respective one of the matrix of performance positions, a corresponding one of the second virtual objects in the action execution state of performing the identical action of the target performance;

in response to a movement control instruction for the first virtual object, controlling the first virtual object to move in the virtual scene; and during movement of the first virtual object, obtaining a distance between the first virtual object and any of the second virtual objects;

when the distance is less than a distance threshold:

allocating a first position in the matrix of performance positions that has not been occupied by any of the second virtual objects for the first virtual object and controlling the first virtual object to automatically perform the identical action of the target performance at the first position in the matrix of performance positions.

2. The method according to claim 1, wherein each performance position has a corresponding position number; and the presenting, at a respective one of the matrix of performance positions, a corresponding one of the second virtual objects in the action execution state of performing the identical action of the target performance comprises:

obtaining a joining order in which each second virtual object joins the target performance; and for each second virtual object, presenting the second virtual object in the action execution state of the target performance at a performance position indicated by a position number corresponding to the joining order of the second virtual object.

3. The method according to claim 1, wherein the target performance has a corresponding performance object quantity threshold; and the controlling the first virtual object to automatically perform the identical action of the target performance comprises:

when an object quantity of the second virtual object does not reach the performance object quantity threshold, controlling the first virtual object to automatically perform the identical action of the target performance.

4. The method according to claim 1, wherein the controlling the first virtual object to automatically perform the identical action of the target performance comprises:

presenting a joining prompt control corresponding to the target performance when the position of the first virtual object meets the execution condition of the target performance; and in response to a joining confirmation instruction that is triggered based on the joining prompt control, controlling the first virtual object to join the target performance.

5. The method according to claim 4, wherein the controlling the first virtual object to join the target performance comprises:

sending a performance joining request in response to the joining confirmation instruction that is triggered based on the joining prompt control, wherein the performance joining request is used for requesting to join the target performance; and controlling, in response to an allow-to-join instruction returned for the performance joining request, the first virtual object to join the target performance.

6. The method according to claim 1, wherein the plurality of second virtual objects comprise an initiating object of the target performance; and the method further comprises:

presenting a performance sensing area corresponding to the initiating object; and during movement of the first virtual object, when the first virtual object moves onto the performance sensing area, determining that the position of the first virtual object meets an execution condition of performing the identical action of the target performance.

7. The method according to claim 1, wherein the method further comprises:

presenting a performance exit function item of the target performance; and in response to a trigger operation for the performance exit function item, controlling the first virtual object to stop automatically performing the identical action of the target performance.

8. The method according to claim 1, wherein the method further comprises:

presenting an invitation function item corresponding to the target performance;

in response to an invitation instruction for a target virtual object is triggered based on the invitation function item, sending an invitation request to a terminal corresponding to the target virtual object; and when a confirmation instruction is received for the invitation request, presenting the target virtual object that automatically performs the identical action of the target performance.

9. The method according to claim 1, wherein after the first virtual object exits the target performance, the method further comprises:

presenting a performance function item;

in response to a trigger operation for the performance function item, presenting a selection control of at least one candidate performance, wherein the candidate performance comprises at least one action; and in response to a selection operation for a target candidate performance is triggered based on the selection control, controlling the first virtual object to be in an action execution state of the target candidate performance, wherein the action execution state of the target candidate performance is used for indicating that the first virtual object performs at least one action comprised in the target candidate performance.

10. The method according to claim 9, wherein the controlling the first virtual object to be in an action execution state of the target candidate performance comprises:

creating and presenting a performance area corresponding to the target candidate performance by using a position of the first virtual object as a reference position; and controlling the first virtual object to automatically perform an action of the target candidate performance at the reference position in the performance area.

11. The method according to claim 10, wherein the performance area comprises at least one performance position, and the method further comprises:

when a position of a third virtual object meets an execution condition of the target candidate performance, presenting the third virtual object at a target performance position of the at least one performance position, wherein the third virtual object automatically performs the action of the target candidate performance.

12. The method according to claim 10, wherein the method further comprises:

when a movement instruction for the first virtual object is received, controlling the first virtual object to move in the virtual scene; and controlling the performance area to synchronously move with the first virtual object.

13. The method according to claim 10, wherein the creating a performance area corresponding to the target candidate performance by using a position of the first virtual object as a reference position comprises:

determining, by using the position of the first virtual object as the reference position, a target area comprising the reference position, and performing obstacle detection on the target area, to obtain a detection result;

when the detection result indicates that there is no obstacle in the target area, determining that the target area is the performance area corresponding to the target candidate performance; and when the detection result indicates that the obstacle exists in the target area, presenting prompt information indicating that the performance area is not creatable at the position of the first virtual object.

14. The method according to claim 9, wherein before the presenting a selection control of at least one candidate performance, the method further comprises:

for each candidate performance, respectively performing the following processing: obtaining an interaction attribute of the first virtual object; and controlling the selection control of the candidate performance to be in the active state when the interaction attribute meets a performance activation condition corresponding to the candidate performance.

15. An electronic device, comprising:

a memory, configured to store computer-executable instructions; and a processor, configured to execute the computer-executable instructions and cause the electronic device to implement a method for controlling a virtual object in a virtual scene including:

presenting, in the virtual scene, a first virtual object and a plurality of second virtual objects that are in an action execution state of a target performance, wherein the action execution state of the target performance indicates that the second virtual objects perform an identical action of the target performance in the virtual scene;

presenting, in the virtual scene, a performance area corresponding to the target performance, wherein the performance area comprises a matrix of performance positions;

presenting, at a respective one of the matrix of performance positions, a corresponding one of the second virtual objects in the action execution state of performing the identical action of the target performance;

in response to a movement control instruction for the first virtual object, controlling the first virtual object to move in the virtual scene; and during movement of the first virtual object, obtaining a distance between the first virtual object and any of the second virtual objects;

when the distance is less than a distance threshold:

allocating a first position in the matrix of performance positions that has not been occupied by any of the second virtual objects for the first virtual object and controlling the first virtual object to automatically perform the identical action of the target performance at the first position in the matrix of performance positions.

16. A non-transitory computer-readable storage medium, storing computer-executable instructions, the computer-executable instructions, when executed by a processor of an electronic device, causing the electronic device to implement a method for controlling a virtual object in a virtual scene including:

presenting, in the virtual scene, a first virtual object and a plurality of second virtual objects that are in an action execution state of a target performance, wherein the action execution state of the target performance indicates that the second virtual objects perform an identical action of the target performance in the virtual scene;

presenting, in the virtual scene, a performance area corresponding to the target performance, wherein the performance area comprises a matrix of performance positions;

presenting, at a respective one of the matrix of performance positions, a corresponding one of the second virtual objects in the action execution state of performing the identical action of the target performance;

in response to a movement control instruction for the first virtual object, controlling the first virtual object to move in the virtual scene; and during movement of the first virtual object, obtaining a distance between the first virtual object and any of the second virtual objects;

when the distance is less than a distance threshold:

allocating a first position in the matrix of performance positions that has not been occupied by any of the second virtual objects for the first virtual object and controlling the first virtual object to automatically perform the identical action of the target performance at the first position in the matrix of performance positions.

* * * * *